US012394864B2

(12) United States Patent
Guo et al.

(10) Patent No.: US 12,394,864 B2
(45) Date of Patent: Aug. 19, 2025

(54) SEPARATOR, ELECTRICAL APPARATUS CONTAINING SUCH SEPARATOR, AND PREPARATION METHOD THEREOF

(71) Applicant: CONTEMPORARY AMPEREX TECHNOLOGY (HONG KONG) LIMITED, Hong Kong (CN)

(72) Inventors: Yongsheng Guo, Ningde (CN); Jiarui Tian, Ningde (CN); Cong Cheng, Ningde (CN); Na Liu, Ningde (CN); Chuying Ouyang, Ningde (CN); Yuanyuan Lan, Ningde (CN); Shuojian Su, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 570 days.

(21) Appl. No.: 17/863,299

(22) Filed: Jul. 12, 2022

(65) Prior Publication Data
US 2022/0359951 A1 Nov. 10, 2022

Related U.S. Application Data

(63) Continuation of application No. PCT/CN2020/117854, filed on Sep. 25, 2020.

(30) Foreign Application Priority Data

Jul. 28, 2020 (CN) .......................... 202010734845.9

(51) Int. Cl.
| | |
|---|---|
| *H01M 50/446* | (2021.01) |
| *H01M 50/403* | (2021.01) |
| *H01M 50/414* | (2021.01) |
| *H01M 50/431* | (2021.01) |
| *H01M 50/449* | (2021.01) |
| *H01M 50/451* | (2021.01) |
| *H01M 50/491* | (2021.01) |

(52) U.S. Cl.
CPC ....... *H01M 50/446* (2021.01); *H01M 50/403* (2021.01); *H01M 50/414* (2021.01); *H01M 50/431* (2021.01); *H01M 50/449* (2021.01); *H01M 50/451* (2021.01); *H01M 50/491* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 12,230,836 B2 * | 2/2025 | Tian .................... | H01M 50/443 |
| 2015/0056491 A1 | 2/2015 | Zhao et al. | |
| 2015/0255796 A1 | 9/2015 | Kim et al. | |
| 2020/0220136 A1 | 7/2020 | Wang et al. | |
| 2020/0220219 A1 * | 7/2020 | Wang .................. | H01M 50/406 |
| 2022/0359951 A1 | 11/2022 | Guo et al. | |
| 2022/0393305 A1 * | 12/2022 | Guo .................... | H01M 50/449 |
| 2023/0285933 A1 * | 9/2023 | Tian .................... | H01M 50/451 |

FOREIGN PATENT DOCUMENTS

| | | |
|---|---|---|
| CN | 101369645 A | 2/2009 |
| CN | 104393220 A | 3/2015 |
| CN | 105271825 A | 1/2016 |
| CN | 107799700 A | 3/2018 |
| CN | 107808944 A | 3/2018 |
| CN | 108807798 A | 11/2018 |
| CN | 109461873 A | 3/2019 |
| CN | 109841784 A | 6/2019 |
| CN | 110295498 A | 10/2019 |
| CN | 110492043 A | 11/2019 |
| CN | 110890504 A | 3/2020 |
| CN | 110915055 A | 3/2020 |
| CN | 111052477 A | 4/2020 |
| JP | 2017224554 A | 12/2017 |
| KR | 100754746 B1 | 9/2007 |
| WO | WO-2013122334 A1 * | 8/2013 ............ B01D 69/02 |
| WO | 2014104687 A1 | 7/2014 |

(Continued)

OTHER PUBLICATIONS

Loera-Serna, S., Oliver-Tolentino, M.A., Lopez-Nunez, M.d.L., Santana-Cruz, A., Guzman-Vargas, A., Cabrera-Sierra, R., Beltran, H.I., Flores, J.—Electrochemical behavior of (Cu3(BTC)2) metal-organic framework: The effect of the method of synthesis, Journal of Alloys and Compounds, 540, pp. 113-120 (Year: 2012).*
United States Patent and Trademark Office (USPTO) The Second Non-Final Office Action for U.S. Appl. No. 17/866,409 Sep. 27, 2023 49 Pages.
Jiang, Guangyu et al. "Sandwich-like Prussian blue/graphene oxide composite films as ion-sieves for fast and uniform Li ionic flux in highly stable Li metal batteries", "Chemical Engineering Journal", Nov. 4, 2019.
The European Patent Office (EPO) Communication pursuant to Article 94(3) EPC for Application No. 20947350.3 Jan. 19, 2024 6 Pages.
The European Patent Office (EPO) The European Search Report or the Supplementary European Search Report for Application No. 20947109.3 Dec. 13, 2023 4 Pages.

(Continued)

*Primary Examiner* — Anca Eoff
(74) *Attorney, Agent, or Firm* — ANOVA LAW GROUP, PLLC

(57) ABSTRACT

This application provides a separator, an electrical apparatus containing such separator, and preparation methods thereof. The separator includes a coating layer containing an organic-inorganic hybrid composite compound and provides improved performance in a number of aspects, and the organic-inorganic hybrid composite compound is formed by periodically assembling, along at least one spatial direction, basic units expressed by formula I, $L_x(M_aC_b)_y \cdot A_z$. This application further provides a battery and an electrical device containing such separator, preparation methods thereof, and an organic-inorganic hybrid composite compound for improving performance of a separator.

15 Claims, 5 Drawing Sheets

(56) References Cited

FOREIGN PATENT DOCUMENTS

| WO | 2018128484 A1 | 7/2018 |
| WO | 2020192678 A1 | 10/2020 |

OTHER PUBLICATIONS

The European Patent Office (EPO) The Extended European Search Report for Application No. 20946634.1 Jan. 15, 2024 7 Pages.
United States Patent and Trademark Office (USPTO) Final Rejection for U.S. Appl. No. 17/866,409 Jan. 16, 2024 16 Pages.
United States Patent and Trademark Office (USPTO) Notice of Allowance for U.S. Appl. No. 17/866,409 Apr. 15, 2024 21 Pages.
China National Intellectual Property Administration (CNIPA) Office Action 1 for Application No. 202080102771.5 Jun. 4, 2024 10 Pages (including translation).
China National Intellectual Property Administration (CNIPA) Office Action 1 for Application No. 202080102780.4 Jun. 4, 2024 10 Pages (including translation).
China National Intellectual Property Administration (CNIPA) Office Action 1 for Application No. 202080102883.0 Jun. 4, 2024 10 Pages (including translation).
The World Intellectual Property Organization (WIPO) International Search Report for PCT/CN2020/117855 Apr. 26, 2021 13 pages (including English translation).
The World Intellectual Property Organization (WIPO) International Search Report for PCT/CN2020/117856 Apr. 25, 2021 13 pages (including English translation).
Ganguli et al., "Studies of Different Hydrated Forms of Prussian Blue". 1983, pp. 1513-1522, Journal of the Chemical Society, Faraday Transactions 1: Physical Chemistry in Condensed Phases, 79.
Wu et al., "Ion-Selective Prussian-Blue-Modifier Celgard Separator for High-Performance Lithium-Sulfur Battery" Jun. 2018, pp. 3345-3351, Chemistry & Sustainability.
The China National Intellectual Property Administration (CNIPA) The First Office Action for Chinese Application 202010734845.9 Jul. 5, 2022 33 Pages (With Translation).
The China National Intellectual Property Administration (CNIPA) The Notice of Second Office Action for Chinese Application 202010734845.9 Dec. 13, 2022 23 Pages (With Translation).
The United States Patent and Trademark Office (USPTO) The Advisory Action for U.S. Appl. No. 17/866,409 Aug. 25, 2023 19 Pages.
The United States Patent and Trademark Office (USPTO) The Final Office Action for U.S. Appl. No. 17/866,409 May 26, 2023 23 Pages.
The United States Patent and Trademark Office (USPTO) The Non-Final Office Action for U.S. Appl. No. 17/866,409 Feb. 13, 2023 21 Pages.
Contemporary Amperex Technology Co., Limited, International Search Report and Written Opinion, PCT/CN2020/117854, Mar. 26, 2021, 9 pgs.
United States Patent and Trademark Office (USPTO) Non-final Rejection for U.S. Appl. No. 17/887,301 Apr. 2, 2025 32 Pages.
State Intellectual Property Office of China Notice of Grant of Invention Patent Rights for Application No. 202080102771.5 Aug. 5, 2024 7 pages (including translation).
State Intellectual Property Office of China Notice of Grant of Invention Patent for Application No. 202080102780.4 Aug. 5, 2024 7 pages (including translation).
State Intellectual Property Office of China Notice of Grant of Invention Patent Rights for Application No. 202080102883.0 Aug. 5, 2024 7 pages (including translation).
The European Patent Office (EPO) Decision to grant a European patent for Application No. 20947350.3 Apr. 3, 2025 3 Pages.
The European Patent Office (EPO) Decision to grant a European patent for Application No. 20947109.3 Apr. 10, 2025 3 Pages.

* cited by examiner

SEPARATOR, ELECTRICAL APPARATUS CONTAINING SUCH SEPARATOR, AND PREPARATION METHOD THEREOF

CROSS-REFERENCE TO RELATED APPLICATIONS

This application is a continuation application of PCT Patent Application No. PCT/CN2020/117854, entitled "SEPARATOR, ELECTRICAL DEVICE COMPRISING SEPARATOR, AND PREPARATION METHOD THEREFOR" filed on Sep. 25, 2020, which claims priority to Chinese Patent Application No. 202010734845.9, entitled "SEPARATOR, ELECTRICAL APPARATUS CONTAINING SUCH SEPARATOR, AND PREPARATION METHOD THEREOF" filed on Jul. 28, 2020, both of which are incorporated herein by reference in their entirety.

TECHNICAL FIELD

This application relates to the field of electrical apparatuses, in particular, to a separator for use in electrical apparatuses, a battery and other electrical apparatuses that contain such separator, an electrical device including the battery or other electrical apparatuses, and preparation methods thereof.

BACKGROUND

Electrical apparatuses are widely used in all fields of the modern society. In many electrical apparatuses, separators need to be used for physical isolation and electrical isolation. Rechargeable batteries are the best known electrical apparatuses that need to use separators. A working principle of rechargeable batteries is to implement repeated charge and discharge through reversible electrochemical reactions. One or more layers of separators are usually used inside the rechargeable battery to isolate a positive electrode side from a negative electrode side, and to provide selective transmission or blocking for materials of different types, sizes, and charges in the system. For example, the separator insulates electrons, and physically separates the positive- and negative-electrode active materials of the secondary battery, avoiding internal short circuit to form an electric field in a specific direction. In addition, ions in the battery can pass through the separator to move between the positive electrode and negative electrode. With development of related fields in recent years, rechargeable batteries are increasingly used in high-tech, high-strength, and high-requirement fields such as new energy vehicles, aerospace, ships, and heavy machinery, and even serve as main power and energy supply equipment in these fields. Compared with conventional rechargeable batteries used in small consumer goods for the past few decades, these high-tech fields are imposing unprecedented requirements on rechargeable batteries, and many of the requirements are closely related to performance of separators in batteries. For example, depending on specific usage, people may urgently expect newly developed separators to achieve at least one of the following effects: being favorable for improvement of at least one of battery energy density, ionic conductivity, and cycling performance; extremely light weight, excellent air permeability, and excellent mechanical strength, abrasion resistance, and peeling resistance; good affinity with liquid phase used in the battery system to achieve excellent electrolyte retention rate and electrolyte wettability; being capable of effectively suppressing gas generation and accumulation inside the battery system to prevent the battery or cell from bulging; good promotion on electrochemical reaction in the battery and significantly inhibiting any adverse effects on electrochemical reaction; excellent thermal properties and thermal stability; and so on.

To this end, researchers in this field have conducted a lot of researches so far, and have made many experimental improvements to materials of the separator, for example, designing polymer composition of a matrix in the separator, or depositing organic polymer particles or inorganic ceramic material particles on the matrix. However, no satisfactory separator has been developed so far.

SUMMARY

A separator in this application exhibits as extremely high energy density, low mass per unit area, high air permeability, high mechanical strength, and excellent electrolyte wettability and retention rate, gas absorption, electrochemical reaction promotion, thermal stability, required thermal parameters, and the like due to a coating layer including specially designed organic-inorganic hybrid composite compound. Rate performance, cycling performance, and the like of batteries and other electrical apparatuses using such separators are greatly improved.

A first aspect of this application provides a separator, where the separator includes:

a polymer matrix layer; and a coating layer applied on at least one surface of the polymer matrix layer, where the coating layer includes an organic-inorganic hybrid composite compound, and the organic-inorganic hybrid composite compound is formed by periodically assembling, along at least one spatial direction, basic units expressed by formula I; where

$$L_x(M_aC_b)_y \cdot A_z \qquad \text{formula I}$$

in formula I, M is a cation of one or more metals selected from the following: Zn, Co, Cu, Fe, Cd, Mn, Ag, Rh, Ru, Be, Mg, Al, Sc, Cr, Ni, Y, Ti, Zr, Hf, Li, Na, K, In, Ca, Sr, Pb, lanthanide metals, and actinide metals, where a is a value ranging from 0.1 to 10;

C is selected from one or more of the following atoms, atomic groups, small molecules, or anions: O, =O, $O^{2-}$, $S^{2-}$, $Cl^-$, $Br^-$, $I^-$, CO, —OH, $OH^-$, and $H_2O$, where b is a value ranging from 0 to 20;

y is a value ranging from 1 to 50;

when M is cations of two or more metals, a product of a and y represents the number of all metal cations in a single basic unit expressed by formula I;

L is selected from one or more of the following ligands: carbazole, a polycarboxylic acid compound, and salts, acids, esters, amides, anhydrides, dimers, and trimers of these ligands, where one or more hydrogen atoms (such as a hydrogen atom directly connected to a carbon atom or a hydrogen atom directly connected to a nitrogen atom) in the ligand may be substituted by one or more substituent groups selected from the following: cyano group, nitro group, amino group, aldehyde group, carboxyl group, halogen (for example, one or more of F, Cl, Br, and I), $C_1$-$C_8$ alkyl group, hydroxy $C_1$-$C_8$ alkyl group, $C_1$-$C_8$ alkoxy group, $C_2$-$C_8$ alkenyl group, $C_2$-$C_8$ alkynyl group, $C_3$-$C_{16}$ cycloalkyl group, $C_6$-$C_{20}$ aryl group, $C_6$-$C_{20}$ heterocyclic group, or any combination thereof, where x is a value ranging from 1 to 50; and A is an atom or cation selected from one or more of the following metal elements: Li, Na, K, Rb, Cs, Be, Sr, Zn, Al, Mg, and Ca; or is selected from one or more of the following molecules: $H_2$, $O_2$, $H_2O$, $CO_2$, $NH_3$, $CH_4$, methyl formate, ethyl acetate, and propylene carbonate, where z is a value ranging from 0 to 100.

According to an implementation of the first aspect, in the organic-inorganic hybrid composite compound, the number of basic units expressed by formula I that are periodically assembled along at least one spatial direction is an integer ranging from 3 to 10,000. According to an implementation of the first aspect, the number of basic units expressed by formula I that are periodically assembled along at least one spatial direction of X, Y, and Z directions of the Cartesian coordinate system is an integer ranging from 3 to 10,000. According to another implementation of the first aspect, an extension direction of periodical assembly of the basic units expressed by formula I is at least one of three spatial directions X', Y', and Z'; the number of periodically assembled basic units is an integer ranging from 3 to 10,000; and the three directions X', Y', and Z' and the X, Y, and Z directions of the Cartesian coordinate system form included angles of 0 degrees to 75 degrees respectively, for example, an included angle of 5 degrees to 60 degrees. According to another implementation of the first aspect, $0.5 \leq x:y \leq 6$. According to another implementation of the first aspect, in a case that b is not zero, $0.5 \leq a:b \leq 8$. According to another implementation of the first aspect, the organic-inorganic hybrid composite compound has the following structure: each M metal cation is bonded to oxygen atoms in a plurality of carboxyl groups in two or more polycarboxylic acid compounds and an optional C by coordinate bonds, to form a basic unit structure. The basic unit structure constitutes a microstructure with a three-dimensional periodic assembly through a remainder of a ligand, with an optional A located in pores of the basic unit. According to another implementation of this first aspect, M is a cation of one or more metals selected from the following: Cu and Zn; and L is selected from one or more of the following ligands: trimesic acid, 3,3',5,5'-biphenyltetracarboxylic acid, and 4,4',4"-tricarboxylic acid triphenylamine. According to another implementation of the first aspect, the basic unit expressed by the formula I in the organic-inorganic hybrid composite compound is selected from one or more of the following: $BTC_2[Cu]_3$, $EBTC\ [Cu]_2$, $EBTC\ [Cu]_2 \cdot (H_2O)_2$, and $NTB_2[Zn_4O]$. According to another implementation of the first aspect, the coating layer further includes one or more components selected from the following: binder, inorganic particles, stabilizer, wetting agent, defoamer, thickener, rheology modifier, pH adjuster, and preservative. According to another implementation of the first aspect, the inorganic particle is selected from at least one of the following: boehmite, zeolite, molecular sieve, alumina, aluminum oxyhydroxide, silica, aluminum nitride, silicon carbide, MgO, CaO, ZnO, $ZrO_2$, $TiO_2$, and a mixture thereof. According to another implementation of the first aspect, a mass ratio of the organic-inorganic hybrid composite compound to the inorganic particles is 1:5 to 5:1.

A second aspect of this application provides a battery, and the battery includes the separator described in any one of the foregoing implementations. According to an implementation, the battery further includes an electrode and an electrolyte. According to an implementation, the battery is a secondary battery.

A third aspect of this application provides an electrical apparatus, the electrical apparatus includes the separator described in any one of the foregoing implementations, and the electrical apparatus is selected from a rechargeable lithium-ion battery, a rechargeable sodium-ion battery, a lithium-sulfur battery, a magnesium battery, a zinc battery, and a supercapacitor. According to an implementation, the electrical apparatus is selected from a secondary lithium-ion battery, a secondary sodium-ion battery, a secondary lithium-sulfur battery, a secondary magnesium battery, and a secondary zinc battery.

A fourth aspect of this application provides an electrical device, and the electrical device includes the battery or the electrical apparatus described in any one of the implementations of the second aspect or the third aspect.

A fifth aspect of this application provides a method for preparing a separator, and the method includes: providing a polymer matrix layer, and forming, on at least one surface of the polymer matrix layer, a coating layer including an organic-inorganic hybrid composite compound, where the organic-inorganic hybrid composite compound is described in any one of the implementations of the first aspect.

A sixth aspect of this application provides a method for improving performance of a separator, and the method includes: providing a polymer matrix layer, and forming, on at least one surface of the polymer matrix layer, a coating layer including an organic-inorganic hybrid composite compound, where improved performance of the separator is selected from at least one of the following: (1) affinity of the separator to electrolyte; (2) air permeability, gas capacity, and anti-bulging performance of the separator; (3) areal density, energy density, and mechanical strength of the separator; (4) heat resistance, flame retardancy, and anti-explosion performance of the separator; (5) ionic conductivity of the separator; and (6) rate performance and cycling performance of a battery cell prepared by using the separator.

A seventh aspect of this application provides an organic-inorganic hybrid composite compound for improving performance of a separator, where improved performance of the separator is selected from at least one of the following: (1) affinity of the separator to electrolyte; (2) air permeability, gas capacity, and anti-bulging performance of the separator; (3) areal density, energy density, and mechanical strength of the separator; (4) heat resistance, flame retardancy, and anti-explosion performance of the separator; (5) ionic conductivity of the separator; and (6) rate performance and cycling performance of a battery cell prepared by using the separator.

According to any one of the implementations of this application, the coating layer of this application is capable of improving performance, and the performance is selected from at least one of the following: energy density, ionic conductivity, cycling performance, weight, air permeability, mechanical strength, abrasion resistance, peeling resistance, anti-bulging, electrochemical reaction promotion, thermal properties, and thermal stability.

In the detailed description section below, design details of the separator, the electrical apparatus, and the preparation method thereof designed in this application are described with reference to the accompanying drawings.

DETAILED DESCRIPTION OF EMBODIMENTS

Figure 1A:
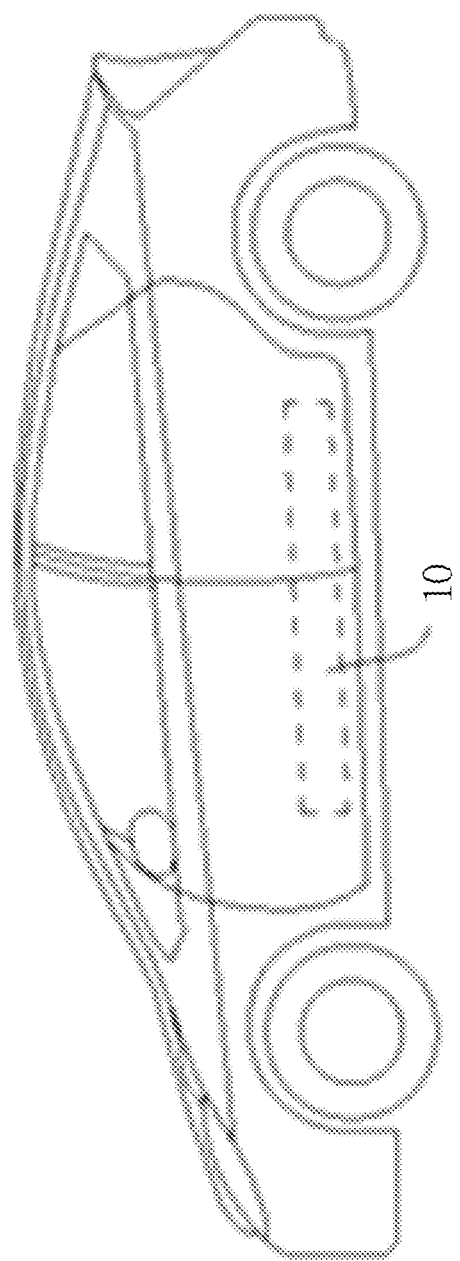
FIG. 1A and FIG. 1B illustrate a vehicle according to an embodiment of this application, where a battery of the vehicle includes a separator of this application.

A "range" disclosed herein may be in a form of upper limit and lower limit, which may be one or more lower limits and one or more upper limits, respectively. A given range is defined by choosing one lower limit and one upper limit. The selected lower and upper limits define boundaries of a particular range. All ranges that can be defined in this manner are inclusive and combinable, that is, any lower limit can be combined with any upper limit to form one range. For example, ranges of 60-120 and 80-110 listed for a specific parameter are construed as ranges of 60-110 and 80-120 being able to be conceived. In addition, if minimum range values 1 and 2 are listed, and maximum range values 3, 4, and 5 are listed, the following ranges can be all conceived: 1-3, 1-4, 1-5, 2-3, 2-4, and 2-5.

In this application, unless otherwise specified, a numerical range "a-b" represents an abbreviated representation of any combination of real numbers from a to b, where both a and b are real numbers. For example, a numerical range "0-5" means that all real numbers within "0-5" have been listed in the specification, and "0-5" is just an abbreviated representation of a combination of these values. In addition, when a parameter is expressed as an integer greater than or equal to 2, it is equivalent to disclose that the parameter is, for example, an integer 2, 3, 4, 5, 6, 7, 8, 9, 10, 11, or 12.

Unless otherwise specified, the term "two" used in this specification refers to "at least two".

In this application, unless otherwise specified, all the embodiments mentioned in this specification can be combined with each other to form a new technical solution.

In this application, unless otherwise specified, all the technical features mentioned in this specification can be combined with each other to form a new technical solution.

In this application, unless otherwise specified, all steps mentioned in this specification can be performed sequentially or performed randomly. For example, the method includes steps (a) and (b), indicating that the method may include steps (a) and (b) performed sequentially, or may include steps (b) and (a) performed sequentially. For example, the method may further include step (c), indicating that step (c) may be added to the method in any order, for example, the method may include steps (a), (b), and (c), or may include steps (a), (c), and (b), or may include steps (c), (a), and (b), and so on.

In this application, unless otherwise specified, "include" mentioned in this specification means an inclusive type or an exclusive type. For example, "include" may mean that other components not listed may also be included, or only the listed components may be included.

In this application, the terms "inside", "outside", "above", "below", and the like that are used for describing a spatial relationship of particular components or objects with respect to other components or objects indicate that the former is located inside, outside, above, or below the latter, and the two may be in direct contact, or be separated by a specific distance or separated by a third component or object.

According to an implementation of this application, the organic-inorganic hybrid composite compound can be prepared in a very simple manner. Specifically, metal cation soluble or insoluble salt, ligand, solvent, and any one or more of other additives (such as pH adjuster, surfactant, oxidizing agent, reducing agent, solubilizer, seed crystal, and raw materials of A and C in formula I) are added based on a set proportion to form a mixed system; the system is sealed and aged at a specific temperature for a specific time, so that the metal cation M, ligand L, and in some embodiment, A and C can be spontaneously assembled (which sometimes can also be considered as ordered co-precipitation), to form the organic-inorganic hybrid composite compound in this application. According to some implementations of this application, small molecules expressed by C may be introduced by adsorption after synthesis of the organic-inorganic hybrid composite compound in this application.

In this application, the ligand contained in the organic-inorganic hybrid composite compound is selected from at least one of the following: carbazole, polycarboxylic acid compound, and salts, acids, esters, amides, anhydrides, dimers, and trimers of these ligands, one or more hydrogen atoms in the ligand (for example, a hydrogen atom directly connected to a carbon atom or a hydrogen atom directly connected to a nitrogen atom) may be, in some embodiments, substituted by one or more substituent groups selected from the following: cyano group, nitro group, amino group, aldehyde group, carboxyl group, halogen (for example. one or more of F, Cl, Br, and I), $C_1$-$C_8$ alkyl group, $C_1$-$C_8$ hydroxyalkyl group, $C_1$-$C_8$ alkoxy group, $C_2$-$C_8$ alkenyl group, $C_2$-$C_8$ alkynyl group, $C_3$-$C_{16}$ cycloalkyl group, $C_6$-$C_{20}$ aryl group, $C_6$-$C_{20}$ heterocyclic group, or any combination thereof, where x is a value ranging from 1 to 50. M and C (and, in some embodiments, A, when A is not methane, methyl formate, ethyl acetate, and propylene carbonate) contribute to the inorganic portion, while L and, in some embodiments, A (where A is methane, methyl formate, ethyl acetate, or propylene carbonate) contribute to the organic portion.

"Periodical assembly", "ordered assembly", and "periodically ordered assembly" may be used interchangeably in this application to mean that the basic unit occurs repeatedly along at least one specified direction, for example, along one, two, or three specified directions, and adjacent basic units are regularly connected by shared points, edges, or faces.

One of the main improvement points of this application is to form, on a polymer matrix, a coating layer including a specially designed organic-inorganic hybrid composite compound. Hereinafter, for the purpose of simplification, the term "organic-inorganic hybrid composite compound" is referred to as "composite compound". That is, in the entire specification of this application, the terms "organic-inorganic hybrid composite compound", "composite compound", and "organic-inorganic hybrid composite compound formed by periodically assembling basic units expressed by formula I" can be used interchangeably. In addition, throughout the entire specification of this application, the terms "pore", "pore channel", and "hole" are used interchangeably to indicate micropore, mesopore, a macroporous structure, or any combination thereof in the composite oxide of this application.

The composite compound specially designed in this application has a microstructure that is quite different from that of conventional metal-organic complexes. Specifically, in the composite compound used in this application, the metal cation expressed by M is coordinated with the ligand expressed by L, and, in some embodiments, C and A are added to form a smallest structural unit (basic unit) expressed by formula I. Then, a plurality of such structural units are periodically assembled along at least one of three directions X, Y, and Z of the Cartesian coordinate system (or along at least one of directions X', Y', and Z' deviated for 0 to 75 degrees with respect to the directions X, Y, and Z of the Cartesian coordinate system) to form a porous material with a periodically porous network framework. A pore size of a pore channel in the framework may be nanoscale (for example, several nanometers, dozens of nanometers, tens of nanometers, or hundreds of nanometers), a pore channel with such a size may be referred to as "nano-pore channel", and a composite compound with a pore channel of such a size may be referred to as "nanoscale composite compound" or "nano composite compound". The pore size of the pore channel in the framework may alternatively be microscale (for example, several micrometers, dozens of micrometers, tens of micrometers, or hundreds of micrometers). A pore channel with such a size may be referred to as "micro-pore channel", and a composite compound with a pore channel of such a size may be referred to as "microscale composite compound" or "micro composite compound". According to a specific assembly form of structural units in the composite compound, the composite compound may possibly include both nano-pore channels and micro-pore channels, and the composite compound may also be referred to as a "mixed composite compound" in this case.

According to an implementation of this application, the basic units are periodically assembled along at least one direction, for example, along one, two, or three directions, to form a composite compound of this application, where the composite compound has a geometric shape selected from one or more of the following: nanorod or microrod, nanowire, mono- or multi-layer sheet, cube, quasi-cube, cuboid, parallelepiped, asymmetric hexahedron, regular octahedron, asymmetric octahedron, sphere, approximate sphere, ellipsoid, approximate ellipsoid, oval, approximate oval, irregular particles, and the like. In this application, an "approximate" shape or a "quasi" shape means that a contour deviation of the shape at any point on its outer contour relative to a standard shape following "approximate" or "quasi" is less than or equal to 20%, for example, less than or equal to 15%, or less than or equal to 10%, or less than or equal to 8%, or less than or equal to 5%, or less than or equal to 2%, or less than or equal to 1%. The so-called contour deviation is determined based on a distance between a particular point on the outer contour and a mass center of the composite compound.

According to an implementation of this application, the metal cation M is a cation selected from one or more of Zn, Co, Cu, Fe, Cd, Mn, Ag, Rh, Ru, Be, Mg, Al, Sc, Cr, Ni, Y, Ti, Zr, Hf, Li, Na, K, In, Ca, Sr, Pb, lanthanide metals, and actinide metals, for example, a cation selected from one of more of Zn, Mn, Ni, Co, Fe, and Cu. For example, the metal cation M may be a cation of Co or Zn. a is a value ranging from 1 to 10, for example, being an integer of 1, 2, 3, 4, 5, 6, 7, 8, 9, or 10; or the value thereof falls within a range defined by any two of these values. In some cases, due to doping, substitution, or a specific degree of lattice defect of a specific metal in the composite compound of this application, a may be described by a non-integer, for example, being about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0; or the value thereof falls within a range defined by any two of these values.

In the basic unit of the composite compound expressed by formula I, C is selected from one or more of the following atoms, atomic groups, small molecules, or anions: O, =O, $O^{2-}$, $S^{2-}$, $Cl^-$, $Br^-$, $I^-$, CO, —OH, $OH^-$, and $H_2O$, and is connected to the metal cation M through ionic, covalent, or coordinate bonds to form a cluster structure of metal cation-anion/metal cation-small atom/metal cation-small molecule, and then the cluster structure and the ligand serve as constituent parts of the basic unit, so as to form the composite compound of this application through periodical self-assembly. According to an implementation of this application, C is an oxygen atom or an oxygen anion, and the metal is combined with C to form a cluster structure, for example, a cluster structure formed by a central metal cation surrounded by oxygen anions, such as a "metal-oxygen tetrahedral cluster" or "metal-oxygen octahedral cluster". Depending on a type of anions surrounding the metal cation, the cluster structure, "metal-oxygen tetrahedral cluster", or "metal-oxygen octahedral cluster" may be either a regular tetrahedron or a regular octahedron, or may be a locally or globally deformed tetrahedron or octahedron. According to another implementation of this application, at least one oxygen ion or oxygen atom surrounding the metal cation (for example, at a top corner of the cluster) in the foregoing cluster structure is substituted by anion or small molecule selected from $S^{2-}$, $Cl^-$, $Br^-$, $I^-$, CO, $CO_2$, —OH, $OH^-$, and $H_2O$, resulting in local or global deformation of the cluster structure. b is a value ranging from 0 to 20, for example, being an integer of 0, 1, 2, 3, 4, 5, 6, 7, 8, 9, 10, 11, 12, 13, 14, 15, 16, 17, 18, 19, or 20; or the value thereof falls within a range defined by any two of these values. In some cases, due to doping, substitution, or a specific degree of lattice defect of a specific metal in the composite compound of this application, b may be described by a non-integer, for example, being about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0; or the value thereof falls within a range defined by any two of these values. y is a value ranging from 0 to 50, for example, being an integer of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50; or the value thereof falls within a range defined by any two of these values. It can be learned that a product of a and y represents the number of M metal cations in a single basic unit expressed by formula I. When formula I contains more than two types of different metal cations described above, the product of a and y represents the number of all metal cations in a single basic unit expressed by formula I. Similarly, a product of b and y represents the number of anions, atoms, or atomic groups represented by C in a single basic unit expressed by formula I. When the basic unit expressed by formula I contains more than two types of different Cs, the product of b and y represents the number of all Cs in a single basic unit of formula I. According to some implementations of this application, a value of b is zero. According to some implementations of this application, in the absence of C, for simplicity, the value of M in a specific compound may be directly written as the product of a and y.

According to another implementation of this application, the ligand L is selected from one or more of the following: in some embodiments, substituted polycarboxylate (radical/ester) and, in some embodiments, substituted polycarbazole (radical/ester). In this application, the term "carbazole (radical/ester)" includes any one of carbazole, carbazole radical, and carbazole ester, and the term "polycarboxylate (radical/ester)" includes any one of polycarboxylate, polycarboxylate radical, and polycarboxylate ester. In this application, the so-called "optionally substituted" means that at least one hydrogen atom directly connected to a carbon atom, a nitrogen atom, an oxygen atom, or a sulfur atom through a covalent bond (for example, a hydrogen atom directly connected to a carbon atom through a covalent bond) in the ligand is substituted by a substituent group selected from the following: cyano group, nitro group, nitroso group, amino group, imino group, aldehyde group, carboxyl group, halogen (for example, fluorine, chlorine, bromine, or iodine), $C_1$-$C_8$ alkyl group (for example, methyl, ethyl, n-propyl, isopropyl, n-butyl, isobutyl, sec-butyl, tert-butyl, n-pentyl, sec-pentyl, n-hexyl, isohexyl, n-heptyl, iso-heptyl, n-octyl, or isooctyl), hydroxy $C_1$-$C_8$ alkyl group (for example, hydroxymethyl, hydroxyethyl, or hydroxypropyl), $C_1$-$C_8$ alkoxy group (for example, methoxy, ethoxy, or propoxy), $C_2$-$C_8$ alkenyl group (for example, vinyl, propenyl, allyl), $C_2$-$C_8$ alkynyl group (for example, ethynyl), $C_3$-$C_{16}$ cycloalkyl group (for example, cyclopropyl, cyclobutyl, cyclopentyl, cyclohexyl, or adamantyl), $C_6$-$C_{20}$ aryl group (for example, phenyl, benzyl, biphenyl, naphthyl, or anthracenyl), and $C_6$-$C_{20}$ heterocyclic group.

According to another implementation of this application, the polycarboxylate (radical/ester) is an substituted aromatic polycarboxylate (carboxylate radical/carboxylate ester). For example, the optionally substituted aromatic polycarboxylic acid (carboxylate radical/carboxylate ester) may be selected from one or more of the following: 1,4-benzenedicarboxylic acid (carboxylate radical/carboxylate ester), 1,2-benzenedicarboxylic acid carboxylate radical/carboxylate ester), 1,3-benzenedicarboxylic acid (carboxylate radical/carboxylate ester), 1,3,5-benzenetricarboxylic acid (carboxylate radical/carboxylate ester), 1,2,3-benzenetricarboxylic acid (carboxylate radical/carboxylate ester), 1,2,4-benzenetricarboxylic acid (carboxylate radical/carboxylate ester), trimesic acid, 2,2',5,5'-biphenyltetracarboxylic acid, 3,3',5,5'-biphenyltetracarboxylic acid, 2,2',4,4'-biphenyltetracarboxylic acid, 3,3',4,4'-biphenyltetracarboxylic acid, 4,4'-biphenyldicarboxylic acid (carboxylate radical/carboxylate ester), 2,2'-biphenyldicarboxylic acid (carboxylate radical/carboxylate ester), 4,4'-biphenyl dicarboxylic acid (carboxylate/carboxylate), 3,3'-biphenyldicarboxylic acid (carboxylate radical/carboxylate ester), 2,4,4'-biphenyltricarboxylic acid (carboxylate radical/carboxylate ester), 3,4,4'-biphenyltricarboxylic acid (carboxylate radical/carboxylate ester), 3,5,4'-biphenyltricarboxylic acid (carboxylate radical/carboxylate ester), 2,4,2'-biphenyltricarboxylic acid (carboxylate/carboxylate), 3,4,2'-biphenyltricarboxylic acid (carboxylate radical/carboxylate ester), 3,5,2'-biphenyltricarboxylic acid (carboxylate radical/carboxylate ester), 2,4,3'-biphenyltricarboxylic acid (carboxylate radical/carboxylate ester), 3,4,3'-biphenyltricarboxylic acid (carboxylate radical/carboxylate ester), 3,5,3'-biphenyltricarboxylic acid (carboxylate radical/carboxylate ester), 1,3,5-tri[4-carboxylate (carboxylate radical/carboxylate ester)phenyl]benzene, and 4,4',4"-triphenylamine tricarboxylate. According to another implementation of this application, the ligand may alternatively be selected from one or more of the following: 1,4-benzenedi(tetrazole) (radical/ester) and 1,3,5-benzenetri(tetrazole) (radical/ester).

x represents the number of ligands contained in the basic unit expressed by formula I, and is a value ranging from 1 to 50, for example, being an integer of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50; or the value thereof falls within a range defined by any two of these values, or may be a decimal value between any two of these values, for example, the value of x may fall within a range defined by any two of the following values: 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 5.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.1, 21.2, 21.5, 21.8, 22.0, 22.1, 22.2, 22.5, 22.8, 23.0, 23.2, 23.5, 23.8, 24.0, 24.2, 24.5, 24.8, 25.0, 26.2, 26.5, 26.8, 27.0, 27.2, 27.5, 27.8, 28.0, 28.2, 28.5, 28.8, 29.0, 29.2, 29.5, 29.8, 30.0, 30.2, 30.5, 30.8, 31.0, 31.2, 31.5, 31.8, 32.0, 32.2, 32.5, 32.8, 33.0, 33.2, 33.5, 33.8, 34.0, 34.2, 34.5, 34.8, 35.0, 35.2, 35.5, 35.8, 36.0, 36.2, 36.5, 36.8, 37.0, 37.2, 37.5, 37.8, 38.0, 38.2, 38.5, 38.8, 39.0, 39.2, 39.5, 39.8, 40.0, 40.2, 40.5, 40.8, 41.0, 41.2, 41.5, 41.8, 42.0, 42.2, 42.5, 42.8, 43.0, 43.2, 43.5, 43.8, 44.0, 44.2, 44.5, 44.8, 45.0, 45.2, 45.5, 45.8, 46.0, 46.2, 46.5, 46.8, 47.0, 47.2, 47.5, 47.8, 48.0, 48.2, 48.5, 48.8, 49.0, 49.2, 49.5, 49.8, and 50.0. When the basic unit expressed by formula I contains two or more types of different ligands L, x represents the sum of the number of all ligands L in a single basic unit expressed by formula I.

In the basic unit expressed by the foregoing formula I, A is an atom or cation selected from one or more of the following metal elements: Li, Na, K, Rb, Cs, Be, Sr, Zn, Al, Mg, and Ca; or is selected from one or more of the following molecules: $H_2$, $O_2$, $H_2O$, $CO_2$, $NH_3$, $CH_4$, methyl formate, ethyl acetate, and propylene carbonate. In this application, there is no significant bonding between the atom, ion, or small molecule expressed by A and other components M, L, and C of the composite compound of this application. For example, there is no covalent bond, coordinate bond, and/or ionic bond. For example, only very weak dispersion force, hydrogen bond, or very weak charge interaction is present between A and M and between L and C. In other words, A may be merely accommodated in a porous structure of the composite compound of this application, and there is no real bonding with the other components of the composite compound. z represents the number of atoms, ions, or small molecules accommodated in the porous structure of the composite compound of this application, and is an integer ranging from 0 to 100 or a decimal, for example, being an integer of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100; or the value thereof falls within a range defined by any two of these values, or a decimal between any two of these values.

In this application, a ratio of x to y (x:y) may vary within a range of 0.5-6, for example, being 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0; or the value thereof falls within a range defined by any two of these values. In this application, in a case that b is not zero, a ratio of a to b (a:b) may vary within a range of 0.1-8, for example, being 0.1, 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0; or the value thereof falls within a range defined by any two of these values. According to an implementation of this application, the number of repetitions of periodical assembly of basic units, expressed by formula I, along at least one of three spatial directions X, Y, and Z of the Cartesian coordinate system (for example, along the X direction, or along the Y direction, or along the Z direction, or along the X and Y directions, or along the X and Z directions, or along the Y and Z directions, for example, along the X direction, the Y direction, and the Z direction) is an integer ranging from 3 to 10,000, for example, being an integer ranging from 5 to 8,000, or an integer ranging from 10 to 7,000, or an integer ranging from 20 to 6,000, or an integer ranging from 50 to 5,000, or an integer ranging from 70 to 4,000, or an integer ranging from 80 to 3,000, or an integer ranging from 90 to 2,000, or an integer ranging from 100 to 1,000. For example, the number of repetitions of periodical assembly along any one of the X, Y, and Z directions (for example, along the three directions X, Y, and Z) is 3, 5, 9, 10, 20, 30, 40, 50, 60, 70, 80, 90, 100, 110, 120, 130, 140, 150, 160, 170, 200, 220, 250, 280, 300, 320, 350, 380, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5500, 5600, 5800, 6000, 6200, 6400, 6500, 6600, 6800, 7000, 7200, 7400, 7500, 7800, 8000, 8200, 8400, 8600, 8800, 9000, 9200, 9400, 9500, 9800, or 10000; or the value thereof falls within a range defined by any two of these values.

According to another implementation of this application, the basic unit expressed by formula I is periodically assembled along any one or more of X', Y', and Z' spatial directions deviating from the X, Y, and Z directions of the Cartesian coordinate system, for example, the X', Y', and Z' directions are deviated from at least one of the three directions X, Y, and Z of the Cartesian coordinate system by a specific angle, respectively, for example, being deviated by 0-70 degrees, deviated by 2-65 degrees, or deviated by 5-60 degrees; or a deviation angle is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70; or a value of the deviation angle falls within a range defined by any two of these values. According to an implementation of this application, the number of repetitions of periodical assembly of basic units, expressed by formula I, along one or more of the X', Y', and Z' directions (for example, along the X' direction, or along the Y' direction, or along the Z' direction, or along the X' and Y' directions, or along the X' and Z' directions, or along the Y' and Z' directions, for example, along the X' direction, the Y' direction, and the Z' direction) is an integer ranging from 3 to 10,000, for example, being an integer ranging from 5 to 8,000, or an integer ranging from 10 to 7,000, or an integer ranging from 20 to 6,000, or an integer ranging from 50 to 5,000, or an integer ranging from 70 to 4,000, or an integer ranging from 80 to 3,000, or an integer ranging from 90 to 2,000, or an integer ranging from 100 to 1,000. For example, the number of repetitions of periodical assembly along any one of the X', Y', and Z' directions (for example, along the three directions X', Y', and Z') is 3, 5, 9, 10, 20, 30, 40, 50, 60, 70, 80, 90, 100, 110, 120, 130, 140, 150, 160, 170, 200, 220, 250, 280, 300, 320, 350, 380, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5500, 5600, 5800, 6000, 6200, 6400, 6500, 6600, 6800, 7000, 7200, 7400, 7500, 7800, 8000, 8200, 8400, 8600, 8800, 9000, 9200, 9400, 9500, 9800, or 10000; or the value thereof falls within a range defined by any two of these values.

According to an implementation of this application, for the purpose of simplification, the basic unit expressed by formula 1 is used to represent the composite compound of this application. As described above, the composite compound is formed by periodically assembling, along at least one spatial direction, the basic units expressed by formula I. According to an implementation of this application, the composite compound of this application is formed by periodically assembling, along three spatial directions, the basic units expressed by formula I, and its macrostructure is expressed as substantially spherical particles. The particle size of these particles is obtained through measurement by using various conventional technical means. The size of the basic unit is determined by types of all components shown in formula I, and an average value or maximum value of the number of repetitions of periodical assembly for the composite compound of this application may be determined by a ratio of the particle size of the particles to a one-dimensional size of the basic unit.

According to an implementation of this application, the composite compound of this application includes neither C nor A. According to another implementation of this application, the composite compound of this application includes both C and A. According to another implementation of this application, the composite compound of this application contains C but no A. According to another implementation of this application, the composite compound of this application contains A but no C.

This application further includes new implementations obtained by combining any two or more of the implementations of this application.

According to an implementation of this application, the framework structure of the composite compound is mainly formed by assembling, in an ordered and even manner, the basic units composed of metal cations expressed by M and ligands expressed by L (and, in some embodiments, C and A), the obtained composite compound has a highly regularly oriented structure. An assembly pattern and a pore size of the composite compound framework structure can be adjusted based on the types and relative proportions of the metal cations and ligands in use, processing conditions used in the synthesis process, and selection of other raw materials. According to an implementation of this application, the metal cation M is connected to the ligand L through one or more of coordinate bond, covalent bond, and ionic bond. According to another implementation of this application, the composite compound of this application includes both M and C, where M and C first form a cluster structure, and then the cluster structure is connected to the ligand L through one or more of coordinate bond, covalent bond, and ionic bond.

According to a special implementation of this application, the composite compound of this application has the following structure. In this structure, the ligand expressed by formula I is a polycarboxylic acid compound, such as an aromatic or heteroaromatic compound having at least two carboxyl groups, for example, the ligand may be a ligand selected from one or more of the following: 1,4-benzenedicarboxylic acid (carboxylate radical/carboxylate ester), 1,2-benzenedicarboxylic acid carboxylate radical/carboxylate ester), 1,3-benzenedicarboxylic acid (carboxylate radical/carboxylate ester), 1,3,5-benzenetricarboxylic acid (carboxylate radical/carboxylate ester), 1,2,3-benzenetricarboxylic acid (carboxylate radical/carboxylate ester), 1,2,4-benzenetricarboxylic acid (carboxylate radical/carboxylate ester), trimesic acid, 2,2',5,5'-biphenyltetracarboxylic acid, 3,3',5,5'-biphenyltetracarboxylic acid, 2,2',4,4'-biphenyltetracarboxylic acid, 3,3',4,4'-biphenyltetracarboxylic acid, 4,4'-biphenyldicarboxylic acid (carboxylate radical/carboxylate ester), 2,2'-biphenyldicarboxylic acid (carboxylate radical/carboxylate ester), 4,4'-biphenyl dicarboxylic acid (carboxylate/carboxylate), 3,3'-biphenyldicarboxylic acid (carboxylate radical/carboxylate ester), 2,4,4'-biphenyltricarboxylic acid (carboxylate radical/carboxylate ester), 3,4, 4'-biphenyltricarboxylic acid (carboxylate radical/carboxylate ester), 3,5,4'-biphenyltricarboxylic acid (carboxylate radical/carboxylate ester), 2,4,2'-biphenyltricarboxylic acid (carboxylate/carboxylate), 3,4,2'-biphenyltricarboxylic acid (carboxylate radical/carboxylate ester), 3,5,2'-biphenyltricarboxylic acid (carboxylate radical/carboxylate ester), 2,4, 3'-biphenyltricarboxylic acid (carboxylate radical/carboxylate ester), 3,4,3'-biphenyltricarboxylic acid (carboxylate radical/carboxylate ester), 3,5,3'-biphenyltricarboxylic acid (carboxylate radical/carboxylate ester), 1,3,5-tri[4-carboxylate (carboxylate radical/carboxylate ester)phenyl]benzene, and 4,4',4''-triphenylamine tricarboxylate. According to an implementation of this application, the metal cation M expressed by formula I is a cation selected from Zn, Co, Cu, Fe, Cd, Mn, Ag, Rh, Ru, Sc, Cr, Ni, Y, Ti, Zr, Hf, Sr, Pb, and lanthanide metals. For example, the metal cation M may be either or both of Zn(II) and Cu(II). According to an implementation of this application, in the composite compound of this application, each metal cation M is bonded to a plurality of oxygen atoms (carbonyl oxygen and hydroxyl oxygen) on a plurality of carboxyl groups in two or more of the foregoing ligands by coordinate bonds, to form a basic unit structure. The basic unit structures are arranged in a regular three-dimensional crystal structure in space, that is, in each of smallest array elements (a cell structure including only one micropore or mesopore), the basic unit structures and the ligands are regularly and linearly arranged along an extension direction of each side, and the smallest array elements are regularly and repeatedly assembled to form basic units expressed by formula I with such structure. The basic units are periodically assembled along at least one of three directions X, Y, and Z of the Cartesian coordinate system, and adjacent basic units are combined by the constituent metal clusters and ligand fragments on the shared corners and edges, to form the complex compound of this application. According to an implementation of this application, the composite compound of this application is formed by periodic assembly of the basic structure expressed by formula I along at least one of the three directions of X, Y, and Z in the Cartesian coordinate system. According to an implementation of this application, the basic unit of the composite compound is $BTC_2[Cu]_3$, $EBTC[Cu]_2$, $EBTC[Cu]_2 \cdot (H_2O)_2$, and $NTB_2[Zn_4O]$, where BTC represents trimesic acid, EBTC represents 3,3',5,5'-biphenyltetracarboxylic acid, and NTB represents 4,4',4''-triphenylamine tricarboxylate.

According to an implementation of this application, C in formula I is not present, that is, b=0. According to an implementation of this application, A is not present, that is, z may be zero.

According to an implementation of this application, the "basic unit" as the smallest repeating unit in the composite compound is obtained by periodically assembling more than one smallest unit cell, for example, a 2×2×2 aggregate formed by periodically assembling 8 smallest unit cells is used as the basic structure of formula I; a 3×3×3 aggregate formed by periodically assembling 27 smallest unit cells is used as the basic structure of formula I; a 4×4×4 aggregate formed by periodically assembling 64 smallest unit cells is used as the basic structure of formula I; a 5×5×5 aggregate formed by periodically assembling 125 smallest unit cells is used as the basic structure of formula I; a 6×6×6 aggregate formed by periodically assembling 216 smallest unit cells is used as the basic structure of formula I; a 7×7×7 aggregate formed by periodically assembling 343 smallest unit cells is used as the basic structure of formula I; an 8×8×8 aggregate formed by periodically assembling 512 smallest unit cells is used as the basic structure of formula I; or a larger aggregate is used as the basic structure of formula I, where in this case, the ratios x, a, b, y, and z in formula I may have larger values.

According to an implementation of this application, a separator having improved performance is prepared by forming, on at least one surface of a matrix layer, a coating layer including the composite compound of this application. The matrix layer used in this application may be a polymer film with a microporous structure, for example, a polymer film selected from the following materials: polyolefin (such as ethylene-propylene copolymer), glass fiber, aramid, polyvinyl alcohol, cellulose, polyethylene oxide, polytetrafluoroethylene, polyallylamine, polyacrylonitrile, polyurethane, polymethyl methacrylate, polyimide, polyethylene terephthalate, polyethylene butylene terephthalate, polyacetal, polycarbonate, polyetheretherketone, polysulfone, polyphenylene ether, polystyrene, polyethylene naphthalene, and physical mixtures or copolymer of any two or more of these materials, where the polyolefin may include polypropylene, polyethylene, and a physical mixture or copolymer thereof. The matrix layer of this application may have different pore sizes as required, for example, 0.01 microns-100 microns, or 0.1 microns-10 microns, or 1 microns-5 microns. A thickness of the matrix layer may be appropriately adjusted as required, for example, the thickness may be 0.1 microns-100 microns, such as 0.5 microns-80 microns, or 1 microns-70 microns, or 2 microns-60 microns, or 4 microns-50 microns, or 5 microns-40 microns, or 6 microns-30 microns, or 7 microns-20 microns, or 8 microns-15 microns, or 9 microns- 12 microns. Based on requirements, a binder layer or a primer layer may, in some embodiments, be firstly applied on at least one surface of the matrix layer before the coating layer including the composite compound of this application is applied on the matrix layer, so as to improve a bonding strength of the coating layer or improve overall performance of the separator. For example, non-limiting examples of the binder that can be used include acrylonitrile-styrene-butadiene copolymer, acrylic-acrylate-acrylonitrile copolymer, acrylic-polyimide, carboxymethyl cellulose, cyanoethyl sucrose, cyanoethyl cellulose, cyanoethyl polyvinyl alcohol, cellulose acetate propionate, cellulose acetate butyrate, cellulose acetate, polyethylene oxide, ethylene-vinyl acetate copolymer, polyvinyl acetate esters, polyvinylpyrrolidone, polyacrylonitrile, polymethylmethacrylate, vinylidene fluoride-trichloroethylene copolymer, vinylidene fluoride-hexafluoropropylene copolymer, or any mixture of these binders. According to another implementation of this application, the binder layer formed between the matrix layer and the coating layer may further include one or more types of inorganic particles, for example, the inorganic particles may be selected from one or more of the following: boehmite, molecular sieve, zeolite, alumina, aluminum oxyhydroxide, silica, aluminum nitride, silicon carbide, MgO, CaO, ZnO, $ZrO_2$, $TiO_2$, and any mixture of these inorganic particles. According to some implementations of this application, the molecular sieve is selected from one or more of the following: ZSM-based molecular sieves such as ZSM-5, ZSM-11, ZSM-12, ZSM-34, and ZSM-41; SAPO-based molecular sieves such as SAPO-5, SAPO-11, SAPO-31, SAPO-34, and SAPO-41; A-type molecular sieve; Y-type molecular sieve; and X-type molecular sieve. According to an implementation of this application, the average particle size of these inorganic particles is 0.001 microns-10 microns, for example, being 0.01 microns-8 microns, or 0.02 microns-7 microns, or 0.03 microns-6 microns, or 0.05 microns-5 microns, or 0.1 microns-4 microns, or 0.5 microns-3 microns, or 0.8 microns-2 microns, or 0.5 microns-1 microns. According to an implementation of this application, in the binder layer, a mass ratio of the binder to the inorganic particles may be 1:0 to 1:10, for example, being 1:0.2 to 1:9, or 1:0.4 to 1:8, or 1:0.5 to 1:7, or 1:0.6 to 1:6, or 1:0.7 to 1:5, or 1:0.8 to 1:4, or 1:1 to 1:3, or 1:1.5 to 1:2. According to another implementation of this application, the coating layer including the composite compound of this application is applied directly to the matrix layer without an binder layer or primer layer applied in between.

According to an implementation of this application, the composite compound of this application is dispersed (dissolved or suspended) in an aqueous solvent or an organic solvent, or in a case of using no solvent, and is applied on the base layer. A specific coating technique may be any one of the following: dip coating, slot-die coating, gravure coating, extrusion coating, blade coating, spin coating, curtain coating, and the like. According to an implementation of this application, the organic solvent may be selected from one or more of the following: water, acetone, methanol, ethanol, acetic acid, dimethylformamide, dimethylacetamide, N-methylpyrrolidone, tetrahydrofuran, dichloromethane, chloroform, and cyclohexane. According to an implementation of this application, in a case of using a solvent, compared to the total weight of the coating layer (solution or suspension) before application, the amount of the solvent may be 5 wt %-95 wt %, for example, being 10 wt %-90 wt %, or 20 wt %-80 wt %, or 30 wt %-70 wt %, or 40 wt %-60 wt %, or 45 wt %-50 wt %.

According to an implementation of this application, in addition to the composite compound including this application, the coating layer formed on the matrix layer may further include one or more binders. The binders may be selected from one or more of the following: polyacrylate, acrylonitrile-styrene-butadiene copolymer, acrylic-acrylate-acrylonitrile copolymer, acrylic-polyimide, carboxymethyl cellulose, cyanoethyl sucrose, cyanoethyl cellulose, cyanoethyl polyvinyl alcohol, cellulose acetate propionate, cellulose acetate butyrate, cellulose acetate, polyethylene oxide, ethylene-vinyl acetate copolymer, polyvinyl acetate esters, polyvinylpyrrolidone, polyacrylonitrile, polymethylmethacrylate, vinylidene fluoride-trichloroethylene copolymer, vinylidene fluoride-hexafluoropropylene copolymer, or any mixture of these binders. According to an implementation of this application, based on the total weight of the finally formed coating layer, the content of the binder may be 1 wt %-25 wt %, for example, being 3 wt %-20 wt %, or 5 wt %-15 wt %, or 6 wt %-10 wt %, or 7 wt %-9 wt %.

According to another implementation of this application, in addition to the composite compound including this application, the coating layer formed on the matrix layer may further include one or more types of inorganic particles. These inorganic particles can have a Dielectric constant greater than 1, piezoelectricity, and/or ionic conductivity, for example, the inorganic particles may be selected from one or more of the following: boehmite, molecular sieve, zeolite, alumina, aluminum oxyhydroxide, silica, aluminum nitride, silicon carbide, MgO, CaO, ZnO, $ZrO_2$, $TiO_2$, and any mixture of these inorganic particles. According to some implementations of this application, the molecular sieve is selected from one or more of the following: ZSM-based molecular sieves such as ZSM-5, ZSM-11, ZSM-12, ZSM-34, and ZSM-41; SAPO-based molecular sieves such as SAPO-5, SAPO-11, SAPO-31, SAPO-34, and SAPO-41; A-type molecular sieve; Y-type molecular sieve; and X-type molecular sieve. According to an implementation of this application, based on the total weight of the finally formed coating layer, the content of the inorganic particles may be 0 wt %-70 wt %, for example, being 10 wt %-65 wt %, or 20 wt %-60 wt %, or 30 wt %-50 wt %, or 35 wt % 45 wt %. According to an implementation of this application, the average particle size of these inorganic particles is 0.001 microns-10 microns, for example, being 0.01 microns-8 microns, or 0.02 microns-7 microns, or 0.03 microns-6 microns, or 0.05 microns-5 microns, or 0.1 microns-4 microns, or 0.5 microns-3 microns, or 0.8 microns-2 microns, or 0.5 microns-1 microns.

According to another implementation of this application, in addition to the composite compound of this application, the coating layer formed on the matrix layer may further include one or more types of other additives, such as stabilizer, wetting agent, rheology modifier, pH adjuster, and preservative.

According to an implementation of this application, the average particle size of the composite compound of this application contained in the coating layer formed on the matrix layer is 0.001 microns-10 microns, for example, being 0.01 microns-8 microns, or 0.02 microns-7 microns, or 0.03 microns-6 microns, or 0.05 microns-5 microns, or 0.1 microns-4 microns, or 0.5 microns-3 microns, or 0.8 microns-2 microns, or 0.5 microns-1 microns. According to another implementation of this application, based on the total weight of the finally formed coating layer, the content of the composite compound of this application may be 0 wt %-99 wt %, for example, being 10 wt %-90 wt %, or 20 wt %-80 wt % %, or 30 wt %-70 wt %, or 40 wt %-60 wt %, or 45 wt %-50 wt %.

According to an implementation of this application, a dispersion (solution, suspension, or slurry) including the composite compound of this application is applied on at least one surface of the matrix layer, to form the coating layer after drying. A thickness of the dried coating layer is 0.1-100 microns, for example, being 0.5 microns-80 microns, or 1 microns-70 microns, or 2 microns-60 microns, or 4 microns-50 microns, or 5 microns-40 microns, or 6 microns-30 microns, or 7 microns-20 microns, or 8 microns-15 microns, or 9 microns-12 microns.

In this application, mainly based on the rechargeable sodium-ion battery and rechargeable lithium-ion battery, the technical effects of the separator of this application have been studied. However, it should be noted herein that the separator of this application may be used for many other electrical apparatuses, and provides corresponding technical improvements. Examples of other electrical apparatuses may include potassium-ion batteries, lithium sulfur batteries, supercapacitors, and the like.

According to an implementation, the electrical apparatus in this application is a battery cell or a battery.

In this application, "battery cell" refers to a battery cell that can be independently charged and discharged. A structure of the battery cell includes a positive electrode, a negative electrode, a separator, an electrolyte (for example, electrolyte), and an outer package for encapsulating the positive electrode, negative electrode, separator, and electrolyte (electrolyte). This application does not have any particular limitation on the type and shape of the battery cell, which may be a punch cell, a cylindrical cell, a prismatic cell, or the like.

"Battery" refers to a single physical module that includes one or more battery cells for providing higher voltage and capacity. The battery may include a battery module and a battery pack. The battery module is formed by electrically connecting a specific quantity of battery cells and putting the battery cells into a frame to protect the battery cells from external impact, heat, vibration, and the like. The battery pack is a final state of a battery system assembled in an electric vehicle (for example, a battery electric vehicle). According to some implementations of this application, the battery pack may be formed by assembling various control and protection systems such as a battery management system and a thermal management component on one or more battery modules. According to some other implementations of this application, various control and protection systems such as a battery management system and a thermal management component may be omitted in the battery module, that is, in this implementation, one or more battery cells may directly form a battery pack, and in such implementations, for the battery system, the number of components is significantly reduced while weight energy density or volume energy density are improved.

The positive electrode applicable to this application may include a positive-electrode active material commonly used in the battery, including, for example, alkali metal manganese oxide, alkali metal cobalt oxide, alkali metal nickel oxide, alkali metal nickel manganese oxide, alkali metal nickel cobalt manganese oxide, alkali metal nickel cobalt aluminum oxide, alkali metal iron oxide, or alkali metal iron phosphate. Other materials may be further included in the positive electrode, such as dopant, conductive agent, binder, ion supplement, or metal foil. The negative electrode applicable to this application may include a negative-electrode material commonly used in the battery, for example, graphite, metallic lithium, graphene, carbon nanotube, soft carbon, hard carbon, titanium oxide, silicon, silicon oxide, silicon-carbon composite, lithium titanate, germanium, tin oxide, transition metal oxide (for example, ferric oxide, ferroferric oxide, cobaltic oxide, cobaltosic oxide, or manganese oxide), or an organic substance with reversible redox properties. According to an implementation of this application, the electrolyte includes a solvent and an electrolyte salt dissolved in the solvent. For example, the solvent used for the electrolyte may include one or more of the following: ethylene carbonate, fluoroethylene carbonate, propylene carbonate, dimethyl carbonate, ethyl methyl carbonate, propyl methyl carbonate, carbonic acid butene ester, diethyl carbonate, methyl butyl carbonate, ethyl propyl carbonate, dipropyl carbonate, cyclopentanone, dimethyl sulfoxide, methyl formate, methyl acetate, ethyl acetate, N-methylpyrrolidone, tetrahydrofuran, dimethyl ether, nitromethane, 2-methoxyethyl acetate, 2-ethoxyethyl acetate, diethyl oxalate, γ-butyrolactone, γ-valerolactone esters, γ-caprolactone, dimethoxyethane, 2-methyltetrahydrofuran, and dioxane. The electrolyte salt used in the electrolyte may be a metal salt, such as sodium salt, lithium salt, potassium salt, magnesium salt, zinc salt, and aluminum salt. According to an implementation, the electrochemical apparatus of this application is a lithium-ion battery, where the electrolyte in use is a sodium salt, which may include, for example, one or more of the following: sodium hexafluorophosphate (V), sodium hexafluoroarsenate (V), sodium perchlorate, sodium tetrachloroaluminate, sodium chloride, sodium tetrafluoroborate, sodium trifluoromethanesulfonate, sodium tetrafluorophosphate, sodium dioxalate borate, sodium difluorooxalate borate, and sodium bis(trifluoromethanesulfonyl) imide; or as required, may be a lithium salt or potassium salt corresponding to the foregoing sodium salt, or a mixture of any two or more of the foregoing sodium salt, lithium salt, and potassium salt. According to an implementation of this application, based on the total weight of the electrolyte, the content of the solvent is 60 wt %-99 wt %, for example, being 65 wt %-95 wt %, or 70 wt %-90 wt %, or 75 wt %-89 wt %, or 80 wt %-85 wt %. According to another implementation of this application, based on the total weight of the electrolyte, the content of the electrolyte salt is 1 wt %-40 wt %, for example, being 5 wt %-35 wt %, or 10 wt %-30 wt %, or 11 wt %-25 wt %, or 15 wt %-20 wt %.

According to an implementation of this application, the positive electrode, the separator, and the negative electrode are stacked in sequence, so that the separator is located between the positive electrode and the negative electrode to separate them. The stacking structure is wound into a roll to obtain a bare cell. The bare cell is encapsulated in an outer packaging material, and the electrolyte is injected to obtain a battery cell for use in the electrical apparatus. According to an implementation of this application, both sides of the matrix layer in the separator are coated with a coating layer including the composite compound of this application. According to another implementation of this application, the coating layer including the composite compound of this application is applied only on one side of the matrix layer of the separator. In this case, the coated side faces toward a negative-electrode side or a positive-electrode side.

According to an implementation of this application, the composite compound of this application may be synthesized in the following manner: According to a general formula of a target product, dispersing corresponding metal cation soluble salt or insoluble salt, and the ligand in a polar solvent (which is water, ammonia, methanol, dimethylformamide, or the like), in some embodiments, adding an oxidizing agent, a reducing agent, a surfactant, or the like as required (alternatively adding only one of these additives, or adding none of these additives), performing aging for a period of time in a sealed environment at a room temperature 80° C.-280° C. (for example, 80° C.-200° C., or 80° C.-120° C.), and performing self-assembly reaction, to obtain the target product.

According to some implementations of this application, an electrical apparatus (for example, a battery) including the separator of this application may be applicable to various electrical devices (electric devices) using the batteries. For example, the electrical device may include a mobile phone, a portable device, a notebook computer, an electric bicycle, a battery electric vehicle, a ship, a spacecraft, an electric toy, or an electric tool. The spacecraft is, for example, an airplane, a rocket, a space shuttle, or a spaceship. The electric toy includes, for example, a fixed or mobile electric toy, such as a game console, an electric vehicle toy, an electric ship toy, and an electric airplane toy. The electric tool includes, for example, an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

Figure 1B:
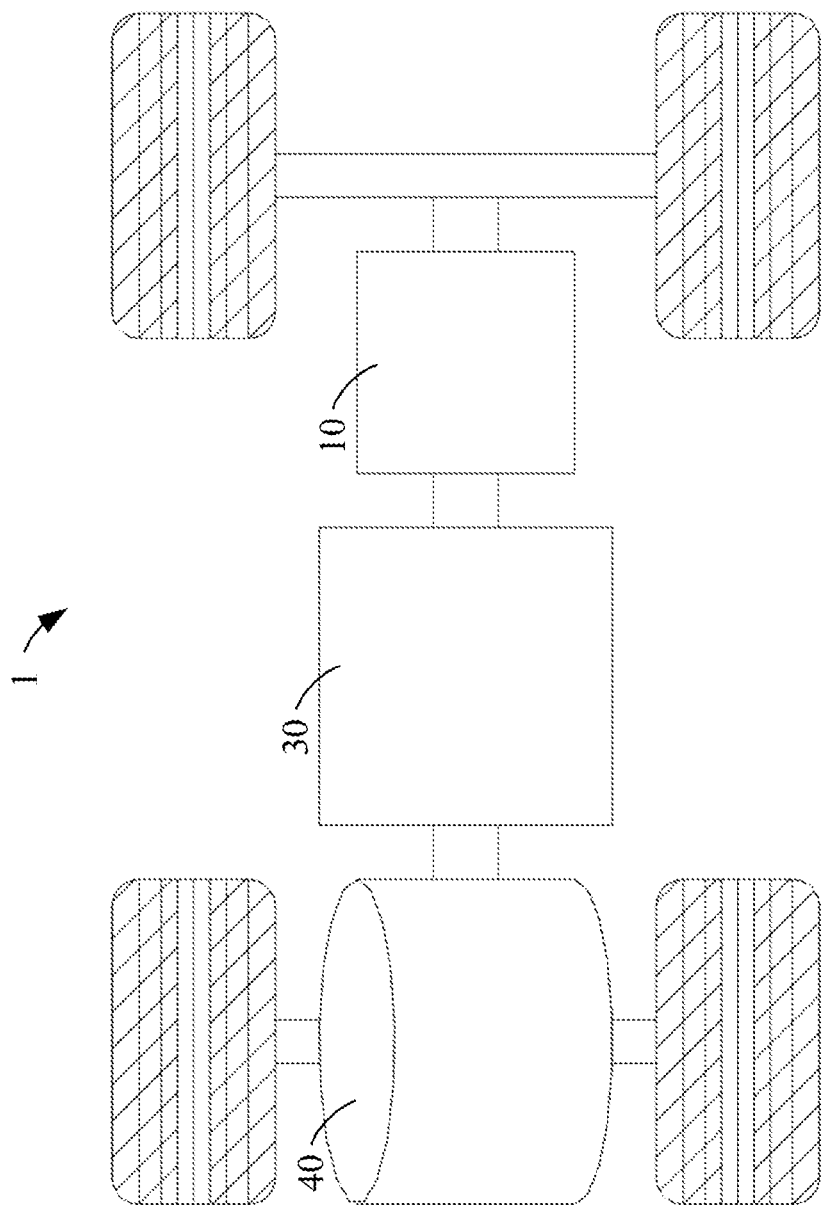

The use of the battery in this application is not limited to the electrical device described above, and its intended use may include batteries in vehicles. For example, FIG. 1A and FIG. 1B are schematic diagrams of a vehicle according to an implementation of this application. The vehicle may be an oil-fueled vehicle, a gas-powered vehicle, or a new energy vehicle. The new energy vehicle may be a battery electric vehicle, a hybrid electric vehicle, an extended-range electric vehicle, or the like. As shown in FIG. 1A, the battery 10 may be disposed inside the vehicle 1, and in FIG. 1A, the battery 10 is disposed at the bottom of the vehicle. However, the battery 10 may alternatively disposed at the front or the rear of the vehicle 1 as required. During running of the vehicle, the battery 10 may power the vehicle 1 in an intermittent or continuous manner. For example, the battery 10 may be used to supply electric power to apparatuses such as a light, an LCD screen, and a lighter of the vehicle 1, and for a hybrid electric vehicle or a battery electric vehicle, the battery 10 may be further used to supply driving power to the vehicle 1. As shown in FIG. 1B, the vehicle 1 may further include a controller 30 and a motor 40, and the controller 30 is configured to control the battery 10 to power the motor 40, for example, to satisfy a working electricity need during start, navigation, and driving of the vehicle 1. In another implementation of this application, the battery 10 can be not only used as an operational power supply for the vehicle 1, but also used as a driving power supply for the vehicle 1, to totally or partially replace the fossil fuel or the natural gas to provide driving power for the vehicle 1. According to an implementation of this application, the battery 10 used in a vehicle may also be a battery pack including a plurality of battery cells 20 shown in FIGS. 2A to 2C.

Figure 2A:
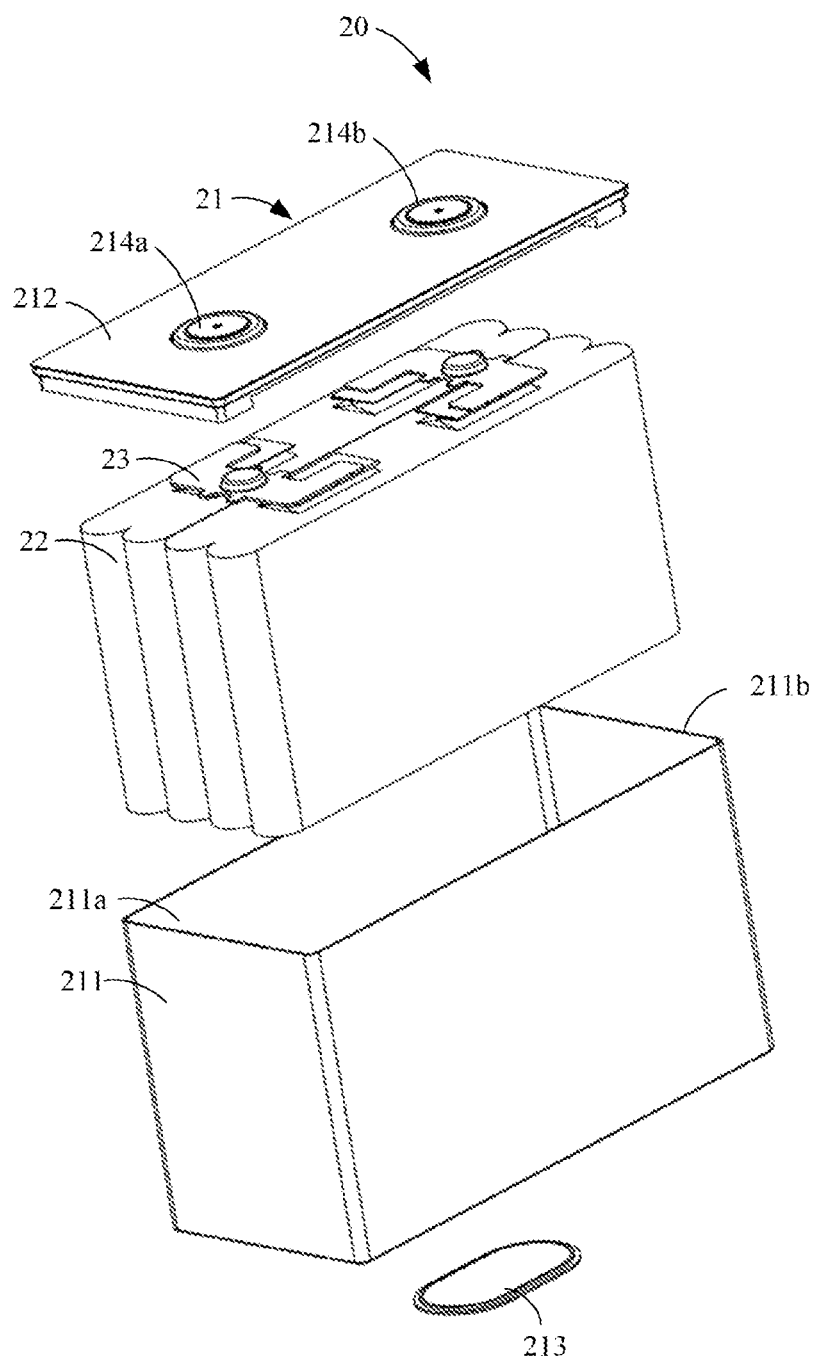
FIG. 2A is a schematic exploded view of a battery according to an embodiment of this application.
Figure 2B:
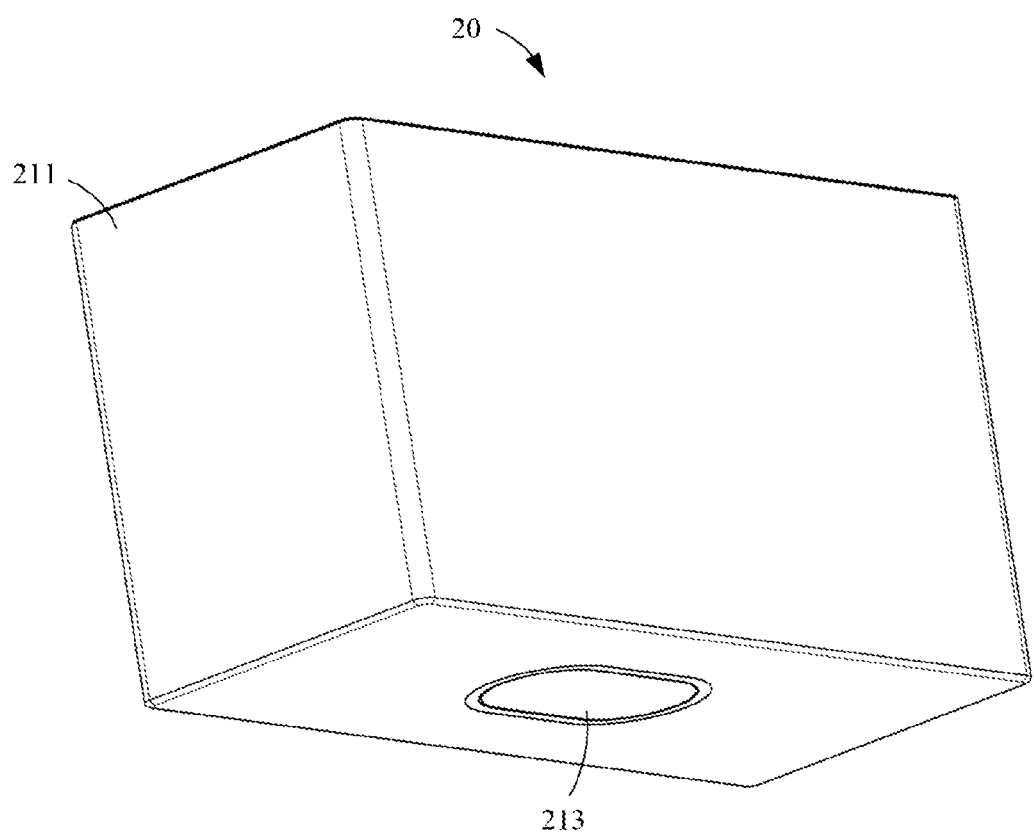
FIG. 2B and FIG. 2C are schematic three-dimensional views of the battery in FIG. 2A.
Figure 2C:
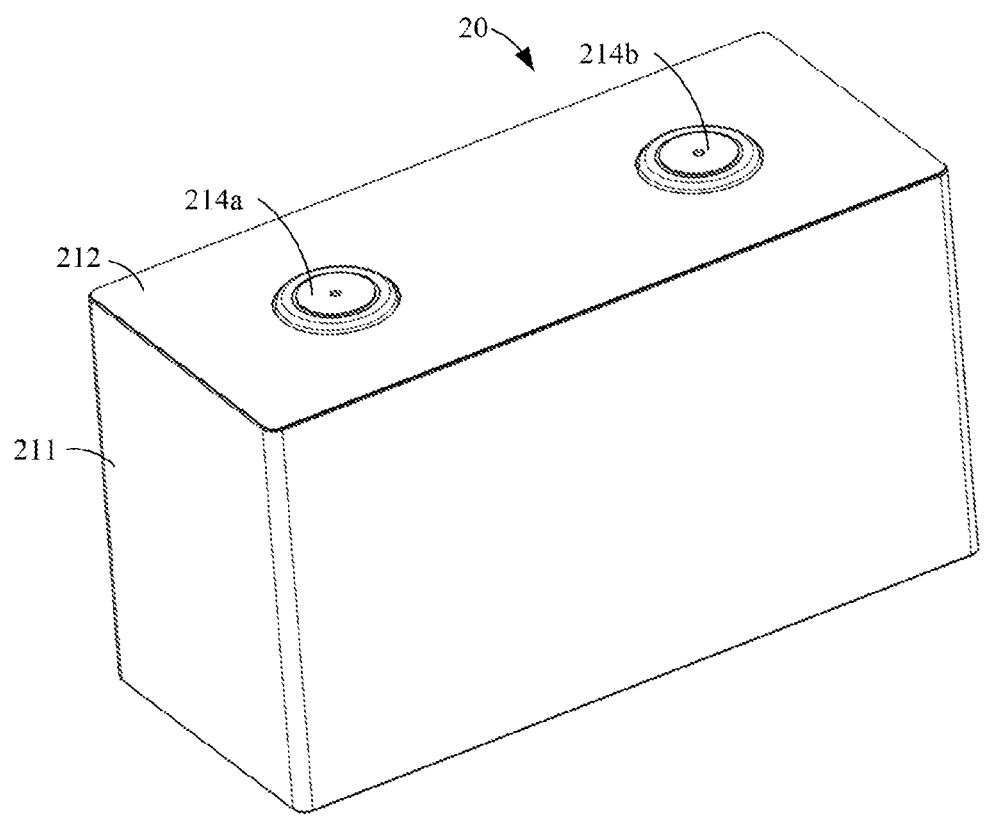

FIGS. 2A to 2C show a battery 10 according to an implementation of this application. In this implementation, the battery may alternatively be referred to as a battery cell 20, and the battery cell 20 includes a case 21, an electrode assembly 22, and an electrolyte, where the electrode assembly 22 is accommodated in the case 21 of the battery cell 20, and the electrode assembly 22 includes a positive electrode plate, a negative electrode plate, and a separator. The separator may be a separator prepared in the embodiments of this application. The electrode assembly 22 may be a wound structure or a laminated structure, for example, may be a structure actually used in the embodiments of this application. The case 21 includes a housing body 211 and a cover plate 212. The housing body 211 includes an accommodating cavity 211*a* enclosed by a plurality of walls, and an opening 211*b*. The cover plate 212 is disposed in the opening 211*b* to close the accommodating cavity 211*a*. In addition to the electrode assembly 22, the accommodating cavity 211*a* further accommodates electrolyte. The positive electrode plate and the negative electrode plate in the electrode assembly 22 are generally provided with tabs, and the tab generally includes a positive-electrode tab and a negative-electrode tab. According to some implementations of this application, the positive-electrode tab is provided in plurality and stacked together, and the negative-electrode tab is provided in plurality and stacked together. The tabs are connected to a positive-electrode terminal 214*a* and a negative-electrode terminal 214*b* outside the battery cell 20 through a connecting member 23. For a prismatic battery cell, as shown in FIGS. 2A and 2C, the positive-electrode terminal 214*a* and the negative-electrode terminal 214*b* may be generally provided on the cover plate 212.

The following describes influence of the separator manufactured according to the embodiments of this application on performance of electrochemical apparatuses based on specific examples. It should be particularly noted that the protection scope of this application is defined by the claims, but not limited to the foregoing specific embodiments.

EXAMPLES

Unless otherwise stated, raw materials used in this application are all analytically pure, and water is deionized water.

Example 1: Synthesis of the Composite Compound of this Application

The composite compound with the basic unit expressed by formula I was synthesized by performing the following steps in this example.

$NTB_2(Zn_4O)$ was prepared by performing the following steps: $Zn(NO_3)_2$ (59.50 g, 0.2 mole) was weighed, and dissolved in dimethylformamide to obtain a solution with a concentration of 0.05 M. $H_3NTB$ (37.63 g, 0.1 mole) was weighed, and dissolved in dimethylformamide to obtain a solution with a concentration of 0.1 M. The resulting solution was added dropwise to a solution of zinc nitrate in dimethylformamide, 20 g 2 wt % surfactant polyethylene glycol (from Jinan Heshun Chemical Co., Ltd., with a degree of polymerization 6000) was added to the mixed dimethylformamide solution, and then the mixture was sealed and aged at 105° C. for 24 h to obtain a solid product.

After reaction, a solid product was collected through suction filtration, washed three times with dimethylformamide, and then dried at 110° C. overnight. The solid product was characterized by X-ray diffraction, and the product was found to have target signal peaks at $2\theta=8°$ and $2\theta=11°$, which proved that a target structure was formed. Elemental analysis was performed through inductively coupled plasma optical emission spectrometry (ICP), which proved that the elemental composition thereof complied with the expected elemental composition of the target product. An average particle size of 0.8 μm was obtained through measurement in characterization by using the laser particle size analysis technique. It was proved that the target product was formed.

Materials shown in the following Table 1 were processed in a same manner as the foregoing steps. Raw material types and raw material ratios of specific materials were summarized in Table 1, and the same techniques were used to characterize products. Characterization results of the resulting products were also summarized in Table 1.

In addition, $H_2O$ in $EBTC[Cu]_2 \cdot (H_2O)_2$ shown in the following Table 1 was introduced by the following method: A solid product $EBTC[Cu]_2$ was synthesized by using the raw material ratio and the pH condition shown in the following Table 1 and the foregoing steps. The solid product was activated at a temperature of 110° C. for 10 hours and placed in a sealed container, into which 1 bar of pure nitrogen containing saturated water vapor was injected, and the sealed container was left standing at room temperature for 36 hours. The resulting solid was characterized by thermogravimetry, and a weight loss of approximately 9.65 wt % was observed at a temperature of ≤200° C. It was determined by calculation that the solid product contained $H_2O$ in the ratio shown in the foregoing general formula.

oxides were also prepared in this example. Specifically, for the separators, the coating layers were also obtained by performing the foregoing steps, with a difference in that a specific weight proportion of the composite compound was substituted by alumina (Shandong Shuochuang Chemical Technology Co., Ltd., an average particle size was about 1.5 μm). The separators and battery cells made therefrom were written hereinafter as 80% $BTC_2[Cu]_3$+20% $Al_2O_3$, 51% $BTC_2[Cu]_3$+49% $Al_2O_3$, 20% $BTC_2[Cu]_3$+80% $Al_2O_3$, respectively.

Example 3: Preparation of the Battery Cell

An active material $Na_{0.9}Fe_{0.5}Mn_{0.5}O_2$, a conductive agent acetylene black (Denka, Denka Black), and a binder polyvinylidene fluoride (Arkema, HSV 900) were fully mixed in N-methylpyrrolidone solvent system at a mass ratio 94:3:3 by stirring evenly to obtain a slurry with a solid content of 30%. A wet coating layer with a thickness of 250 μm was

TABLE 1

Raw materials and characterization results of the composite compound in the Examples of this application

| | Raw material of metal cation and ligand | Aging temperature (° C.) | ICP analysis | XRD peak position | Average particle size |
|---|---|---|---|---|---|
| $BTC_2[Cu]_3$ | $Cu(NO_3)_2$:$H_3BTC$ = 3:2 | 200 | Element proportion complying with chemical formula | 8°, 11° | 0.5 μm |
| $EBTC[Cu]_2$ | $Cu(NO_3)_2$:$H_4NTB$ = 2:1 | 180 | Element proportion complying with chemical formula | 8°, 11° | 0.7 μm |
| $EBTC[Cu]_2 \cdot (H_2O)_2$ | $Cu(NO_3)_2$:$H_4NTB$ = 2:1 | 140 | Element proportion complying with chemical formula | 8°, 11° | 1 μm |
| $NTB_2(Zn_4O)$ | $Zn(NO_3)_2$:$H_3NTB$ = 2:1 | 110 | Element proportion complying with chemical formula | 8°, 11° | 0.8 μm |

Example 2: Preparation of the Separator

A PP-PE copolymer microporous film with a thickness of 16 μm manufactured by Dongguan Advanced Electronic Technology Co., Ltd. was used as a matrix layer, whose average pore size is 80 nm. The same-quality composite compound prepared in Example 1 was used, and mixed evenly with a binder polymethyl acrylate (produced by Hubei Norna Technology Co., Ltd.), a stabilizer sodium carboxymethyl cellulose (chemically pure), a wetting agent polyoxyethylene ether (produced by Hubei Norna Technology Co., Ltd.) at a ratio of 85:6:3:3:3, and water was added during mixing to obtain a water-based slurry with a solid content of 9%. The slurry was applied on two surfaces of the matrix layer through scrape coating, to form a wet coating layer with a thickness of about 10 microns on the two surfaces, was placed in an oven, and was then dried at a temperature of 80° C. for 60 minutes to obtain a separator whose dry coating layer is 2 microns in thickness. The separator prepared in this example, the battery cell, and the battery were hereinafter named according to a type of composite compound used for the separator.

In addition, three separators whose coating layers contain the composite compound of this application and inorganic formed on one side of an Al foil with a thickness of 12 μm by using a transfer coating method, and then was placed in an oven and dried at a temperature of 150° C. for 60 minutes, followed by cold pressing using a roller at a pressure of 60 tons, to obtain a positive electrode plate, where a dry coating layer on one side of the Al foil was 130 μm in thickness.

An active material hard carbon, a conductive agent acetylene black, a binder styrene-butadiene rubber, and a thickener sodium carboxymethyl cellulose were fully mixed in a deionized water solvent system at a mass ratio 95:2:2:1 by stirring evenly to obtain a slurry with a solid content of 15%. The slurry was applied on one side of an Al foil with a thickness of 12 μm by using a blade to form a wet coating layer with a thickness of 120 μm, and then placed in an oven and dried at a temperature of 150° C. for 60 minutes, followed by cold pressing using a cold presser at a pressure of 50 tons, to obtain a negative electrode plate, where a dry coating layer on one side of the Al foil is 60 μm in thickness.

The positive electrode plate, the separator prepared in Example 2, and the negative electrode plate were rolled up in sequence, to form a wound and laminated structure with a size of 16 cm×10 cm×2.8 cm. The bare cell was placed in a steel case, and 150 grams of electrolyte was injected and encapsulated to obtain the battery cell. The electrolyte was a 1M $NaPF_6$ PC solution.

Comparative Examples 1 to 4: Preparation of Separators and Battery Cells for Comparison In Comparative example 1, the microporous film described in Example 2 was used as the separator. In Comparative Examples 2 to 4, the separators were prepared by performing the steps of Example 2, and a difference lies in that aluminum hydroxide (produced by Shandong Shuochuang Chemical Technology Co., Ltd., where an average particle size is about 0.6 μm), SAPO-34 (produced by Taizhou Juna, where an average particle size is about 1.2 μm), and alumina (produced by Shandong Shuochuang Chemical Technology Co., Ltd., where an average particle size is about 1.5 μm) with the same weight replaced the composite compound of this application. The separators were used to prepare battery cells in a same manner as Example 3.

Example 4: Characterization of Electrolyte Affinity of Separators and Performance of Battery Cells In this example, the following parameters were characterized: porosity, electrolyte wettability, and electrolyte retention rate of the separators prepared in Example 2 and Comparative Examples 1 to 4; and electrolyte injection rate, rate performance, and cycling performance of the battery cells prepared in Example 3 and Comparative Examples 1 to 4.

Method for Measuring Porosity of the Separator:

One separator with a size of 10 cm×10 cm×20 μm (the separator in Comparative Example 1 was 16 μm in thickness due to no coating layer formed on the surface) prepared in Example 2 or Comparative Examples 1 to 4 was fetched, and a volume of the separator was obtained through calculation based to the size of the separator. A dry mass $m_p$ of the separator was weighed to calculate a dry density $\rho_p$ of the separator. The separator was soaked in n-butanol for 10 hours, and after being taken out, the separator was weighed to obtain a wet weight. Based on a difference between the wet weight and the dry weight, a mass $m_a$ of n-butanol totally absorbed by the separator was determined. A density $\rho_a$ of the n-butanol was a known parameter, and the porosity of the separator was obtained through calculation by using the following formula based on the foregoing parameters. It can be seen that a total porosity of both the matrix layer and the coating layer is considered in this total porosity. However, in a case that other components in the matrix layer and the coating layer remain unchanged for different separators, the total porosity very intuitively reflects impact of the composite compound of this application on the porosity of the separator.

$$P=(m_a/\rho_a)/(m_a/\rho_a+m_p/\rho_p)\times 100\%$$

Method for Measuring Electrolyte Wettability of the Separator:

One drop (about 0.05 mL) of protic hydrophilic electrolyte with electrolyte (1M $NaPF_6$ in ethylene carbonate (EC): ethyl methyl carbonate (EMC)=1/1 W/W solution) was added to the separators that were prepared in Example 2 or Comparative Examples 1 to 4 and were placed horizontally. After five minutes, an approximate area infiltrated by the electrolyte was obtained through statistics by using a grid method. Specifically, a measurement manner of the grid method is as follows: Five minutes later, an upper surface of the separator was photographed directly from above, and then squares each with an area of 0.1 $cm^2$ were used to cover all areas showing traces of electrolyte infiltration in the photo. A square totally occupied by the trace of electrolyte infiltration was recorded as "fully infiltrated", a square with an electrolyte infiltration area being equal to or greater than half of the square was also recorded as "fully infiltrated", and a square with an electrolyte infiltration area being less than half of the square was recorded as "not infiltrated". The final electrolyte wettability of the separator was equal to the number of fully infiltrated squares×0.1, measured in square centimeters.

Method for Measuring Electrolyte Retention Rate of the Separator:

One separator with a size of 10 cm×10 cm×20 μm (the separator in Comparative Example 1 was 16 μm in thickness due to no coating layer formed on the surface) prepared in Example 2 or Comparative Examples 1 to 4 was fetched, and a dry weight $W_0$ of the separator was weighed. Then, the separator was soaked in the electrolyte for 10 hours, and was left standing in a sealed container for 1 hour to make the separator saturated with the electrolyte. Then, the wet weight W of the separator was weighed, and the electrolyte retention rate was obtained through calculation based on the following formula. It can be learned that the electrolyte retention rate not only characterizes a capacity of the electrolyte included in the separator, but also reflects the electrolyte retention capacity of the separator.

$$\text{Electrolyte retention rate}=[(W-W_0)/W_0]\times 100\%$$

Method for Measuring Electrolyte Injection Rate of the Battery Cell:

An electrolyte was injected in the battery cell in Example 3 and Comparative Examples 1 to 4 through vacuum electrolyte injection. A time from fully mass-transferring the electrolyte in a discrete state to inside of the separator and mass-transferring to the inside of the positive- and negative-electrode plates to fully infiltrating the battery cell was recorded, under the premise that the obtained battery cells had normal performance (a performance diving phenomenon caused by insufficient electrolyte did not occur within 100 cycles).

Method for Measuring Rate Performance:

The battery cell was placed in a test tunnel of an Arbin electrochemical workstation, charged to a charge cut-off voltage of 4 V with a constant current at a rate of 0.1 C, charged at a constant voltage for 30 minutes, and then discharged to a discharge cut-off voltage of 2.5 V with a constant current at a rate of 0.1 C and 1 C separately. The discharge capacity was recorded as 0.1 C capacity and 1 C capacity, respectively. Rate performance=1 C capacity/0.1 C capacity×100%.

Method for Measuring Cycling Performance:

The battery cell was placed in a test tunnel of an Arbin electrochemical workstation, charged to a charge cut-off voltage of 4 V with a constant current at a rate of 1 C, left standing for 5 min, and then discharged to a discharge cut-off voltage of 2.5 V with a constant current at a rate of 1 C. The discharge capacity was recorded, and the battery cell was then left standing for another 5 min. The foregoing steps were performed for 100 cycles. Cycling performance=$100^{th}$-cycle capacity/$1^{st}$-cycle capacity×100%.

Measurement results of electrolyte affinity performance of the separator of this application and working performance of the battery cell were summarized in the following Table 2.

charged to a charge cut-off voltage of 4.0 V with a constant current at a rate of 0.1 C, charged at a constant voltage for 30 minutes, and then discharged to a discharge cut-off voltage of 2.5 V with a constant current at a rate of 0.1 C.

TABLE 2

Measurement results of electrolyte affinity performance and cycling performance of separators and battery cells in this application

| | Porosity of separator (%) | Electrolyte wettability of separator (cm$^2$) | Electrolyte retention rate of separator (%) | Electrolyte injection rate of battery cell (min) | Rate performance at1 C/0.1 C (%) | Cycling performance 100$^{th}$-cycle/1st-cycle (%) |
|---|---|---|---|---|---|---|
| Comparative Example 1, PP-PE bare film | 50 | 3.3 | — | 200 | 84 | 76 |
| Comparative Example 2, AlOOH | 45 | 7.3 | 150 | 180 | 87 | 78 |
| Comparative Example 3, SAPO-34 | 44 | 7.4 | 162 | 170 | 88 | 70 |
| Comparative Example 4, Al$_2$O$_3$ | 43 | 5.8 | 138 | 240 | 88 | 82 |
| BTC$_2$[Cu]$_3$ | 44 | 8.5 | 195 | 150 | 77 | 83 |
| EBTC[Cu]$_2$ | 44 | 9.4 | 222 | 120 | 84 | 87 |
| 80% BTC$_2$[Cu]$_3$ + 20% Al$_2$O$_3$ | 44 | 9.3 | 213 | 150 | 83 | 86 |
| 51% BTC$_2$[Cu]$_3$ + 49% Al$_2$O$_3$ | 44 | 9.4 | 199 | 180 | 88 | 88 |
| 20% BTC$_2$[Cu]$_3$ + 80% Al$_2$O$_3$ | 43 | 8.8 | 172 | 180 | 89 | 83 |
| EBTC[Cu]$_2$•(H$_2$O)$_2$ | 44 | 9.4 | 237 | 130 | 85 | 87 |
| NTB$_2$[Zn$_4$O] | 44 | 9.6 | 244 | 130 | 86 | 88 |

It can be learned from the foregoing Table 2 that, although the separators of all the examples and comparative examples have very similar porosity, the separator provided by the examples of this application exhibits excellent electrolyte wettability and electrolyte retention rate because the coating layer on the surface contains the composite compound provided in the example of this application. The battery cell prepared with such separator has a significantly lower electrolyte injection rate and significantly improved rate performance and cycling performance.

Example 5: Characterization of Properties Such as Anti-Bulging Performance and Mechanical Property of Separators and Battery Cells In this example, the following technical means were used to characterize various properties of the separators and battery cells of the Examples and Comparative Examples that are obtained in Examples 2 and 3 and Comparative Examples 1 to 4.

Method for Measuring Battery Swelling Rate:

The battery cells obtained in the foregoing Example 3 and Comparative Examples 1 to 4 of this application were assembled into a punch battery for charge and discharge tests, and 1000 ppm of water was added to the electrolyte to accelerate gas production. A volume of the battery before charging and discharging was tested by using a drainage method, and was denoted as V1, and the volume of the battery after 100 cycles of charging and discharging was denoted as V2. Battery swelling rate P=(V2−V1)/V1×100%.

Testing Method for Cell Energy Density:

The battery cells obtained in the foregoing Example 3 of this application and Comparative Examples 1 to 4 were Energy released during discharging at the constant current was recorded and was divided by total mass of the battery cell to obtain the cell energy density.

Testing Method for Areal Density:

The separators obtained in Example 2 of this application and Comparative Examples 1 to 4 were used. A square coating layer separator with a size of 10 cm×10 cm was weighed to obtain its mass, and the mass was divided by its area to obtain the areal density.

Testing Method for Air Permeability:

The separators obtained in Example 2 of this application and Comparative Examples 1 to 4 were used. The Gurley 4110N tester was used to measure air permeability of the separator, which was a Gurley index of a time required for 100 mL of air to pass through the separator.

Testing Method for Peeling Strength:

The separators (the only difference is that the separator used herein has a coating layer on one side) obtained in Example 2 of this application and Comparative Examples 1 to 4 were used. A clean and neat separator sample was fetched, and the sample was cut into strips of 15 mm×20 mm. A polyethylene terephthalate (PET) sheet matrix was also cut into strips of 15 mm×20 mm, and the other side of the separator with no coating layer was tightly attached to the polyethylene terephthalate (PET) sheet matrix. A 3M tape was tightly attached to the side with the coating layer. A tension machine was used to fix one end of the foregoing pressed sample, and pull the 3M tape at the other end. The tension machine was started, and the test result was a peeling force (peeling strength).

TABLE 3

Measurement results of battery swelling rate, cell energy density, areal density, air permeability, and peeling strength of separators and battery cells in the examples of this application

| | Battery swelling rate (%) | Cell energy density (Wh/kg) | Areal density (mg/cm$^2$) | Air permeability Gurley index | Peeling strength (kgf/cm) |
|---|---|---|---|---|---|
| Comparative Example 1, PP-PE bare film | 29 | 100.14 | 0.59 | — | — |
| Comparative Example 2, AlOOH | 24 | 100.29 | 0.92 | 190 | 1.72 |
| Comparative Example 3, SAPO-34 | 48 | 100.32 | 0.89 | 188 | 1.71 |
| Comparative Example 4, Al$_2$O$_3$ | 22 | 99.95 | 1.13 | 236 | 1.75 |
| BTC$_2$[Cu]$_3$ | 24 | 100.44 | 0.69 | 183 | 1.72 |
| EBTC[Cu]$_2$ | 18 | 100.45 | 0.67 | 169 | 1.73 |
| 80% BTC$_2$[Cu]$_3$ + 20% Al$_2$O$_3$ | 23 | 100.36 | 0.68 | 172 | 1.73 |
| 51% BTC$_2$[Cu]$_3$ + 49% Al$_2$O$_3$ | 17 | 100.35 | 0.70 | 165 | 1.81 |
| 20% BTC$_2$[Cu]$_3$ + 80% Al$_2$O$_3$ | 21 | 100.12 | 0.81 | 204 | 1.75 |
| EBTC[Cu]$_2$(H$_2$O)$_2$ | 20 | 100.44 | 0.68 | 180 | 1.80 |
| NTB$_2$[Zn$_4$O] | 18 | 100.46 | 0.65 | 178 | 1.75 |

It can be seen from the foregoing Table 3, compared with the Comparative Examples, the separators provided by the examples of this application exhibit improved areal density, air permeability, and peeling strength because the coating layer on the surface contains the composite compound provided in the examples of this application, and the battery cells and batteries prepared by using such separators exhibit excellent anti-bulging performance and excellent cell energy density.

Example 6: Characterization of Properties Such as Heat Resistance, Limiting Oxygen Index, and Ionic Conductivity of Separators and Battery Cells In this example, the following technical means were used to characterize various properties of the separators and battery cells of the Examples and Comparative Examples that are obtained in Examples 2 and 3 and Comparative Examples 1 to 4.

Testing Method for Heat Resistance:

The separators obtained in Example 2 of this application and Comparative Examples 1 to 4 were used. A uniform and neat separator sample sheet was cut into 12 cm×12 cm units, and marked transverse dimension (TD) and longitudinal dimension (MD). Straight lines were drawn in the transverse and longitudinal dimensions by using a mark pen, their lengths were measured by using a vernier caliper, and data were recorded. The sample was placed into a constant temperature and humidity box, and kept warm for a given time. After the sample was taken out of the constant temperature and humidity box and left standing for 15 minutes to 20 minutes, lengths of the drawn straight lines were measured by using a vernier caliper, and data were recorded. Based on dimensional data recorded before and after heat treatment, thermal shrinkage data in the transverse dimension (TD) and the longitudinal dimension (MD) were calculated.

Measurement Method for Hot Box Test:

The battery cells obtained in the foregoing Example 3 of this application and Comparative Examples 1 to 4 were used for preparation of batteries. The battery was stored at 150° C. for 1 hour, and it was then checked whether explosion or burst of the battery was caused. A sample passing the hot box test was denoted as ○, and a sample that was exploded or burst was denoted as x.

Testing Method for Limiting Oxygen Index:

The separators obtained in Example 2 of this application and Comparative Examples 1 to 4 were used. The sample sheet was cut into strips 20 mm wide and 200 mm long, and several layers of the strips were stacked to reach a thickness of approximate 0.1 mm. A winding rod was used to wind the stacked strips into a roll shape, and a limiting oxygen index analyzer was used to measure an oxygen index according to GB/T2406-93. The measurement result was a minimum oxygen concentration (volume percentage) required for the sample to maintain combustion. A larger value indicates better flame retardancy of the obtained separator.

Testing Method for Ionic Conductivity:

The separators obtained in Example 2 of this application and Comparative Examples 1 to 4 were used. Based on the method of restricted symmetric cell, constant voltage AC impedance spectroscopy testing was conducted on separators with different quantities of layers by using the Bio-logic electrochemical workstation. An intercept of intersection of an impedance curve and a real part on a Nyquist plot was Rs, and was compared against a known Rs parameter of a standard conductivity sample, to obtain the ionic conductivity.

TABLE 4

Measurement results of heat resistance, flame retardancy, and ionic conductivity of separators in the examples of this application

| | Thermal shrinkage (heat resistance) (%) | | Hot box test | Limiting oxygen index | Ionic conductivity ($10^{-3}$ S/cm) |
|---|---|---|---|---|---|
| | MD | TD | | | |
| Comparative Example 1, PP-PE bare film | 7.5 | 5.4 | x | 17.1 | — |
| Comparative Example 2, AlOOH | 2 | 0.8 | o | 21.2 | 0.7 |
| Comparative Example 3, SAPO-34 | 2.1 | 0.9 | x | 20.6 | 0.6 |
| Comparative Example 4, $Al_2O_3$ | 2.3 | 0.8 | o | 19.5 | 0.8 |
| $BTC_2[Cu]_3$ | 1.8 | 1.5 | o | 22.0 | 1.1 |
| $EBTC[Cu]_2$ | 1.5 | 0.9 | o | 22.1 | 1.2 |
| 80% $BTC_2[Cu]_3$ + 20% $Al_2O_3$ | 2.1 | 1.4 | o | 21.9 | 1.2 |
| 51% $BTC_2[Cu]_3$ + 49% $Al_2O_3$ | 2.0 | 1.2 | o | 22.0 | 1.2 |
| 20% $BTC_2[Cu]_3$ + 80% $Al_2O_3$ | 2.1 | 1.1 | o | 21.5 | 1.0 |
| $EBTC[Cu]_2 \cdot (H_2O)_2$ | 1.6 | 0.8 | o | 23.8 | 2.3 |
| $NTB_2[Zn_4O]$ | 1.4 | 0.6 | o | 23.4 | 1.6 |

It can be learned from experimental results of the foregoing Table 4, compared with the Comparative examples, the separators provided by the examples of this application exhibit improved heat resistance, flame retardancy, and excellent ionic conductivity because the coating layer on the surface contains the composite compound provided in the examples of this application.

What is claimed is:

1. A separator, comprising:
 a polymer matrix layer; and
 a coating layer applied on at least one surface of the polymer matrix layer, wherein the coating layer comprises an organic-inorganic hybrid composite compound, and the organic-inorganic hybrid composite compound is formed by periodically assembling, along at least one spatial direction, basic units expressed by formula I; wherein

$$L_x(M_aC_b)_y \cdot A_z \quad \text{formula I}$$

in formula I, M is a cation of one or more metals selected from the following: Zn, Co, Cu, Fe, Cd, Mn, Ag, Rh, Ru, Be, Mg, Al, Sc, Cr, Ni, Y, Ti, Zr, Hf, Li, Na, K, In, Ca, Sr, Pb, lanthanide metals, and actinide metals, wherein a is a value ranging from 0.1 to 10;
 C is selected from one or more of the following atoms, atomic groups, small molecules, or anions: O, =O, $O^{2-}$, $S^{2-}$, $Cl^-$, $Br^-$, $I^-$, CO, —OH, $OH^-$, and $H_2O$, wherein b is a value ranging from 0.1 to 20;
 y is a value ranging from 1 to 50;
 when M is cations of two or more metals, a product of a and y represents the number of all metal cations in a single basic unit expressed by formula I;
 L is selected from one or more of the following ligands: carbazole, polycarboxylic acid compounds, and salts, acids, esters, amides, anhydrides, dimers, and trimers of these ligands, wherein one or more hydrogen atoms in the ligand are, in some embodiments, substituted by one or more substituent groups selected from the following: cyano group, nitro group, amino group, aldehyde group, carboxyl group, halogen, $C_1$-$C_8$ alkyl group, hydroxy $C_1$-$C_8$ alkyl group, $C_1$-$C_8$ alkoxy group, $C_2$-$C_8$ alkenyl group, $C_2$-$C_8$ alkynyl group, $C_3$-$C_{16}$ cycloalkyl group, $C_6$-$C_{20}$ aryl group, $C_6$-$C_{20}$ heterocyclic group, or any combination thereof, wherein x is a value ranging from 1 to 50; and
 A is an atom or cation selected from one or more of the following metal elements: Li, Na, K, Rb, Cs, Be, Sr, Zn, Al, Mg, and Ca; or is selected from one or more of the following molecules: $H_2$, $O_2$, $H_2O$, $CO_2$, $NH_3$, $CH_4$, methyl formate, ethyl acetate, and propylene carbonate, wherein z is a value ranging from 0 to 100, wherein each M metal cation is bonded to oxygen atoms in a plurality of carboxyl groups in two or more polycarboxylic acid compounds and a C by coordinate bonds, to form a basic unit structure, the basic unit structure constitutes a microstructure with a three-dimensional periodic assembly through a remainder of a ligand, the basic unit has pores, and when z is not zero, A is located in the pores of the basic unit.

2. The separator according to claim 1, wherein in the organic-inorganic hybrid composite compound, the number of basic units expressed by formula I that are periodically assembled along at least one spatial direction is an integer ranging from 3 to 10,000.

3. The separator according to claim 1, wherein $0.5 \leq x:y \leq 6$; and/or
 $0.5 \leq a:b \leq 8$.

4. The separator according to claim 1, wherein M is a cation of one or more metals selected from the following: Cu and Zn; and
 L is selected from one or more of the following ligands: trimesic acid, 3,3',5,5'-biphenyltetracarboxylic acid, and 4,4',4"-tricarboxylic acid triphenylamine.

5. The separator according to claim 1, wherein the basic unit is selected from one or more of the following: EBTC $[Cu]_2 \cdot (H_2O)_2$, and $NTB_2[Zn_4O]$.

6. The separator according to claim 1, wherein the coating layer further comprises one or more components selected from the following: binder, inorganic particles, stabilizer, wetting agent, rheology modifier, defoamer, thickener, pH adjuster, and preservative; and/or the coating layer further comprises inorganic particles, and the inorganic particles are selected from at least one of the following: boehmite, molecular sieve, zeolite, alumina, aluminum oxyhydroxide, silica, aluminum nitride, silicon carbide, MgO, CaO, ZnO, $ZrO_2$, $TiO_2$, and a mixture thereof, and/or a mass ratio of the organic-inorganic hybrid composite compound to the inorganic particles is 1:5 to 5:1.

7. A battery, comprising the separator according to claim 1.

8. A preparation method of the separator according to claim 1, wherein the method comprises:
providing a polymer matrix layer; and
forming, on at least one surface of the polymer matrix layer, a coating layer comprising an organic-inorganic hybrid composite compound.

9. The separator according to claim 2, wherein $0.5 \leq x:y \leq 6$; and/or
$0.5 \leq a:b \leq 8$.

10. The separator according to claim 2, wherein M is a cation of one or more metals selected from the following: Cu and Zn; and L is selected from one or more of the following ligands: trimesic acid, 3,3',5,5'-biphenyltetracarboxylic acid, and 4,4',4''-tricarboxylic acid triphenylamine.

11. The separator according to claim 2, wherein the basic unit is selected from one or more of the following: EBTC $[Cu]_2 \cdot (H_2O)_2$, and $NTB_2[Zn_4O]$.

12. The separator according to claim 2, wherein the coating layer further comprises one or more components selected from the following: binder, inorganic particles, stabilizer, wetting agent, rheology modifier, defoamer, thickener, pH adjuster, and preservative; and/or the coating layer further comprises inorganic particles, and the inorganic particles are selected from at least one of the following: boehmite, molecular sieve, zeolite, alumina, aluminum oxyhydroxide, silica, aluminum nitride, silicon carbide, MgO, CaO, ZnO, $ZrO_2$, $TiO_2$, and a mixture thereof, and/or a mass ratio of the organic-inorganic hybrid composite compound to the inorganic particles is 1:5 to 5:1.

13. The separator according to claim 3, wherein M is a cation of one or more metals selected from the following: Cu and Zn; and L is selected from one or more of the following ligands: trimesic acid, 3,3',5,5'-biphenyltetracarboxylic acid, and 4,4',4''-tricarboxylic acid triphenylamine.

14. The separator according to claim 3, wherein the basic unit is selected from one or more of the following: EBTC $[Cu]_2 \cdot (H_2O)_2$, and $NTB_2[Zn_4O]$.

15. The separator according to claim 3, wherein the coating layer further comprises one or more components selected from the following: binder, inorganic particles, stabilizer, wetting agent, rheology modifier, defoamer, thickener, pH adjuster, and preservative; and/or the coating layer further comprises inorganic particles, and the inorganic particles are selected from at least one of the following: boehmite, molecular sieve, zeolite, alumina, aluminum oxyhydroxide, silica, aluminum nitride, silicon carbide, MgO, CaO, ZnO, $ZrO_2$, $TiO_2$, and a mixture thereof, and/or a mass ratio of the organic-inorganic hybrid composite compound to the inorganic particles is 1:5 to 5:1.

* * * * *